US010571744B1

(12) United States Patent
Chang et al.

(10) Patent No.: US 10,571,744 B1
(45) Date of Patent: Feb. 25, 2020

(54) DISPLAYS WITH ADJUSTABLE DIRECT-LIT BACKLIGHT UNITS AND POWER CONSUMPTION COMPENSATION

(71) Applicant: Apple Inc., Cupertino, CA (US)

(72) Inventors: Sean C. Chang, Mountain View, CA (US); Tobias Jung, San Francisco, CA (US); Marc Albrecht, San Francisco, CA (US); Abdeslam Hafidi, Cupertino, CA (US); Jun Qi, San Jose, CA (US); Duane M. Petrovich, San Francisco, CA (US); Mingxia Gu, Campbell, CA (US); Xiang Fang, San Jose, CA (US); Pierre-Yves Emelie, Mountain View, CA (US); Wei H Yao, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/388,496

(22) Filed: Apr. 18, 2019

(51) Int. Cl.
*G02F 1/1335* (2006.01)
*G09G 3/36* (2006.01)
*G09G 3/34* (2006.01)

(52) U.S. Cl.
CPC .. *G02F 1/133611* (2013.01); *G02F 1/133606* (2013.01); *G02F 1/133608* (2013.01); *G09G 3/342* (2013.01); *G09G 3/3685* (2013.01); *G09G 2320/064* (2013.01); *G09G 2330/021* (2013.01)

(58) Field of Classification Search
CPC ......... G02F 1/133611; G02F 1/133606; G02F 1/133608; G09G 3/342; G09G 3/3685; G09G 2320/064; G09G 2330/021
See application file for complete search history.

(56) References Cited

U.S. PATENT DOCUMENTS

| 6,903,716 | B2 | 6/2005 | Kawabe et al. |
| 7,495,646 | B2 | 2/2009 | Kawabe et al. |
| 7,658,529 | B2 | 2/2010 | Aoki et al. |
| 8,295,627 | B2 | 10/2012 | Lin et al. |
| 8,300,195 | B2 | 10/2012 | Hwang et al. |
| 8,456,495 | B2 | 6/2013 | Fujiwara et al. |
| 8,766,904 | B2 | 7/2014 | Neal |
| 9,066,092 | B2 | 6/2015 | Seshadri et al. |

(Continued)

*Primary Examiner* — Mark Edwards
(74) *Attorney, Agent, or Firm* — Treyz Law Group, P.C.; Joseph F. Guihan

(57) ABSTRACT

A display may have a pixel array such as a liquid crystal pixel array. The pixel array may be illuminated by a backlight unit that includes an array of light-emitting diodes. A backlight brightness selection circuit may select brightness values for the light-emitting diodes. The backlight brightness selection circuit may select the brightness values based on image data, based on brightness values used in previous image frames, based on device information, and/or based on sensor information. The backlight brightness selection circuit may select the backlight brightness levels to mitigate visible artifacts such as flickering and halo. The backlight levels selected by the backlight brightness selection may be modified by a power consumption compensation circuit. The power consumption compensation circuit may estimate the amount of power consumption required to operate the backlight using the target brightness levels and may modify the target brightness levels to meet maximum power consumption requirements.

14 Claims, 15 Drawing Sheets

(56) References Cited

U.S. PATENT DOCUMENTS

| | | |
|---|---|---|
| 9,204,138 B2 | 12/2015 | Bennett et al. |
| 9,329,432 B2 | 5/2016 | Ek et al. |
| 9,373,287 B2 | 6/2016 | Margerm et al. |
| 9,740,046 B2 | 8/2017 | Wyatt |
| 10,263,701 B2 | 4/2019 | Aoyama et al. |
| 10,264,225 B2 | 4/2019 | Seetzen et al. |
| 2005/0104839 A1 | 5/2005 | Baik |
| 2008/0186393 A1* | 8/2008 | Lee .................. G09G 3/3406 348/301 |
| 2009/0322800 A1* | 12/2009 | Atkins .............. G09G 3/3413 345/690 |
| 2011/0090261 A1 | 4/2011 | Kang et al. |
| 2011/0310116 A1* | 12/2011 | Muijs ................ G06T 5/007 345/617 |
| 2012/0306942 A1* | 12/2012 | Fujiwara ............ G09G 3/3413 345/690 |
| 2012/0327136 A1 | 12/2012 | Uehara et al. |
| 2015/0194083 A1 | 7/2015 | Sinha et al. |
| 2017/0110069 A1* | 4/2017 | Shoshan ............ G09G 5/026 |
| 2018/0166005 A1 | 6/2018 | Lee et al. |
| 2019/0088193 A1* | 3/2019 | Tada ................. G09G 5/10 |

\* cited by examiner

DISPLAYS WITH ADJUSTABLE DIRECT-LIT BACKLIGHT UNITS AND POWER CONSUMPTION COMPENSATION

BACKGROUND

This relates generally to displays, and, more particularly, to backlit displays.

Electronic devices often include displays. For example, computers and cellular telephones are sometimes provided with backlit liquid crystal displays. Edge-lit backlight units have light-emitting diodes that emit light into an edge surface of a light guide plate. The light guide plate then distributes the emitted light laterally across the display to serve as backlight illumination. Direct-lit backlight units have arrays of light-emitting diodes that emit light vertically through the display.

Direct-lit backlights may have locally dimmable light-emitting diodes that allow dynamic range to be enhanced and power consumption to be reduced. If care is not taken, however, a direct-lit backlight may be bulky or may produce undesired visible artifacts.

SUMMARY

A display may have a pixel array such as a liquid crystal pixel array. The pixel array may be illuminated with backlight illumination from a backlight unit. The backlight unit may include an array of light-emitting diodes, with each light-emitting diode being placed in a respective cell. The brightness of each light-emitting diode may be changed in each display frame to optimize the viewing of the display.

A backlight brightness selection circuit may select brightness values for the light-emitting diodes in the backlight unit. The backlight brightness selection circuit may select the brightness values based on image data. The backlight brightness selection circuit may select the brightness values based on brightness values used by the light-emitting diodes in previous image frames. The backlight brightness selection circuit may select the brightness values based on device information such as information regarding which software applications are currently operating on the electronic device. The backlight brightness selection circuit may select the brightness values based on display information such as a display operating mode. The backlight brightness selection circuit may select the brightness values based on environmental conditions such as the ambient light level or temperature.

The backlight brightness selection circuit may use a content analysis circuit that generates target brightness values based on image content. A flicker mitigation circuit may modify the target brightness values to reduce visible flickering during operation of the display. The flicker mitigation circuit may use a temporal filter to reduce flickering, for example. A halo mitigation circuit may modify the target brightness values to reduce visible halo in the displayed image. The halo mitigation circuit may prioritize between mitigating visible halo and preserving dynamic range in the image based on the content of the image and other received information.

A flash mitigation circuit in the backlight brightness selection circuit may identify when there is a risk of a detectable flash occurring and may take suitable mitigating action when a flash risk is detected. A scene change detection circuit may identify when a scene change has occurred by comparing the brightness values of one or more previous frames to target brightness values of the current frame. If a scene change is detected, suitable action may be taken (e.g., the parameters of the flicker mitigation circuit may be modified).

The backlight levels selected by the backlight brightness selection may be modified by a power consumption compensation circuit. The power consumption compensation circuit may receive the target backlight levels from the backlight brightness selection circuit and may estimate the amount of power consumption required to operate the backlight using the target brightness levels. The power consumption compensation circuit may estimate the amount of power consumption using one or more look-up tables. The power consumption compensation circuit may assess both static power consumption (associated with a single display frame) and dynamic power consumption (associated with a sequence of display frames).

DETAILED DESCRIPTION

Figure 1:
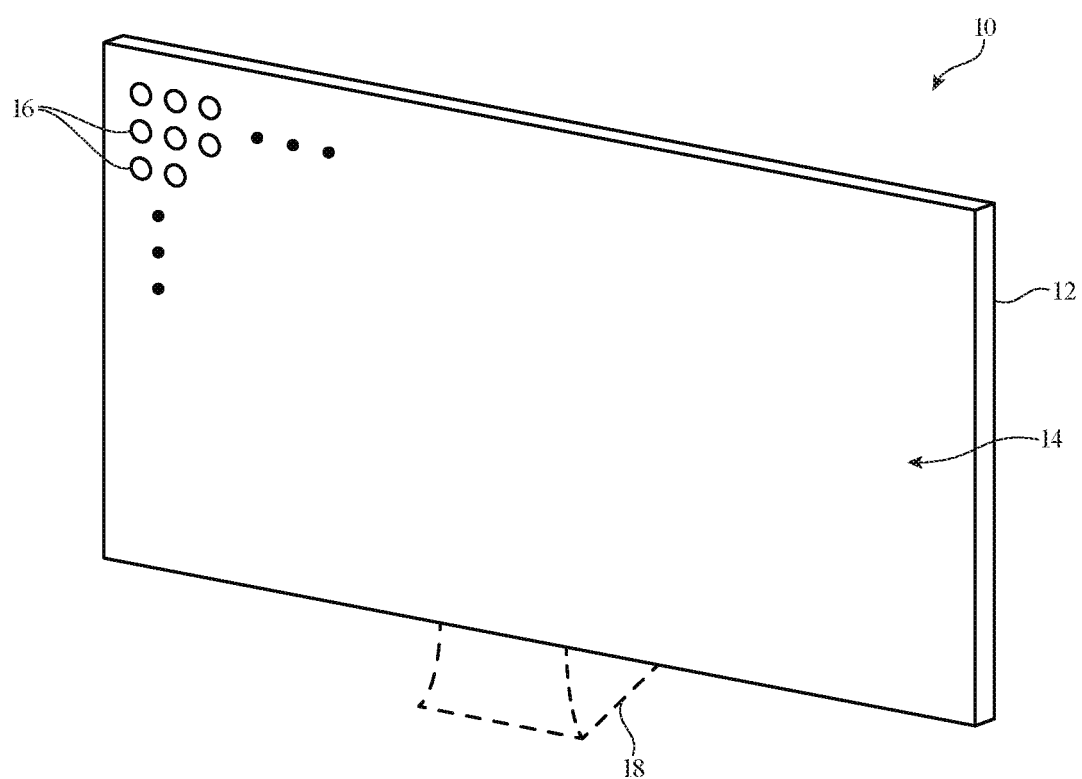
FIG. 1 is a diagram of an illustrative electronic device having a display in accordance with an embodiment.

Electronic devices may be provided with backlit displays. The backlit displays may include liquid crystal pixel arrays or other display structures that are backlit by light from a direct-lit backlight unit. A perspective view of an illustrative electronic device of the type that may be provided with a display having a direct-lit backlight unit is shown in FIG. 1. Electronic device 10 of FIG. 1 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

As shown in FIG. 1, device 10 may have a display such as display 14. Display 14 may be mounted in housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Housing 12 may have a stand such as optional stand 18, may have multiple parts (e.g., housing portions that move relative to each other to form a laptop computer or other device with movable parts), may have the shape of a cellular telephone or tablet computer (e.g., in arrangements in which stand 18 is omitted), and/or may have other suitable configurations. The arrangement for housing 12 that is shown in FIG. 1 is illustrative.

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of pixels 16 formed from liquid crystal display (LCD) components or may have an array of pixels based on other display technologies. A cross-sectional side view of display 14 is shown in FIG. 2.

Figure 2:
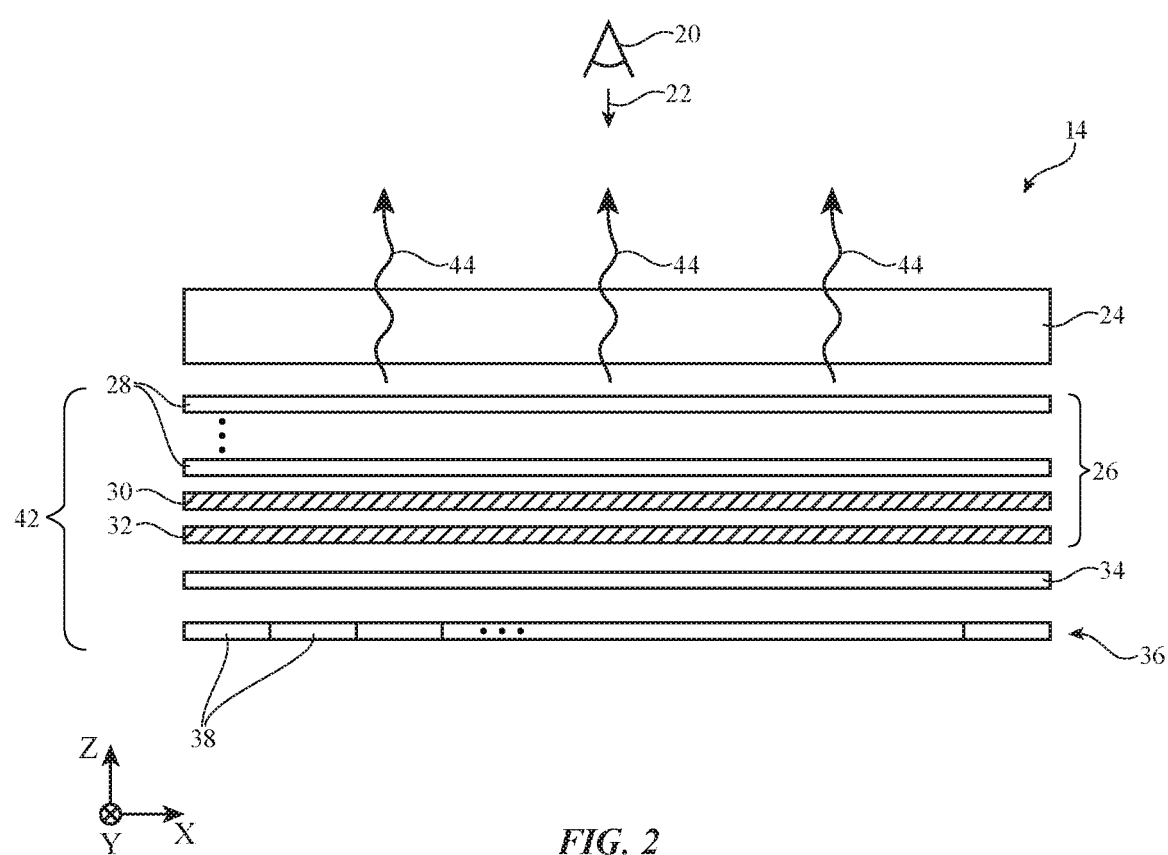
FIG. 2 is a cross-sectional side view of an illustrative display in accordance with an embodiment.

As shown in FIG. 2, display 14 may include a pixel array such as pixel array 24. Pixel array 24 may include an array of pixels such as pixels 16 of FIG. 1 (e.g., an array of pixels having rows and columns of pixels 16). Pixel array 24 may be formed from a liquid crystal display module (sometimes referred to as a liquid crystal display or liquid crystal layers) or other suitable pixel array structures. A liquid crystal display for forming pixel array 24 may, as an example, include upper and lower polarizers, a color filter layer and a thin-film transistor layer interposed between the upper and lower polarizers, and a layer of liquid crystal material interposed between the color filter layer and the thin-film transistor layer. Liquid crystal display structures of other types may be used in forming pixel array 24, if desired.

During operation of 14, images may be displayed on pixel array 24. Backlight unit 42 (which may sometimes be referred to as a backlight, backlight layers, backlight structures, a backlight module, a backlight system, etc.) may be used in producing backlight illumination 44 that passes through pixel array 24. This illuminates any images on pixel array 24 for viewing by a viewer such as viewer 20 who is viewing display 14 in direction 22.

Backlight unit 42 may have optical films 26, a light diffuser such as light diffuser (light diffuser layer) 34, and light-emitting diode array 36. Light-emitting diode array 36 may contain a two-dimensional array of light sources such as light-emitting diodes 38 that produce backlight illumination 44. Light-emitting diodes 38 may, as an example, be arranged in rows and columns and may lie in the X-Y plane of FIG. 2.

The light produced by each light-emitting diode 38 may travel upwardly along dimension Z through light diffuser 34 and optical films 26 before passing through pixel array 24. Light diffuser 34 may contain light-scattering structures that diffuse the light from light-emitting diode array 36 and thereby help provide uniform backlight illumination 44. Optical films 26 may include films such as dichroic filter 32, phosphor layer 30, and films 28. Films 28 may include brightness enhancement films that help to collimate light 44 and thereby enhance the brightness of display 14 for user 20 and/or other optical films (e.g., compensation films, etc.).

Light-emitting diodes 38 may emit light of any suitable color. With one illustrative configuration, light-emitting diodes 38 emit blue light. Dichroic filter layer 32 may be configured to pass blue light from light-emitting diodes 38 while reflecting light at other colors. Blue light from light-emitting diodes 38 may be converted into white light by a photoluminescent material such as phosphor layer 30 (e.g., a layer of white phosphor material or other photoluminescent material that converts blue light into white light). If desired, other photoluminescent materials may be used to convert blue light to light of different colors (e.g., red light, green light, white light, etc.). For example, one layer 30 (which may sometimes be referred to as a photoluminescent layer or color conversion layer) may include quantum dots that convert blue light into red and green light (e.g., to produce white backlight illumination that includes, red, green, and blue components, etc.). Configurations in which light-emitting diodes 38 emit white light (e.g., so that layer 30 may be omitted, if desired) may also be used.

In configurations in which layer 30 emits white light such as white light produced by phosphorescent material in layer 30, white light that is emitted from layer 30 in the downwards (−Z) direction may be reflected back up through pixel array 24 as backlight illumination by dichroic filter layer 32 (i.e., layer 32 may help reflect backlight outwardly away from array 36). In configurations in which layer 30 includes, for example, red and green quantum dots, dichroic filter 32 may be configured to reflect red and green light from the red and green quantum dots, respectively to help reflect backlight outwardly away from array 36. By placing the photoluminescent material of backlight 42 (e.g., the material of layer 30) above diffuser layer 34, light-emitting diodes 38 may be configured to emit more light towards the edges of the light-emitting diode cells (tiles) of array 36 than at the centers of these cells, thereby helping enhance backlight illumination uniformity.

Figure 3:
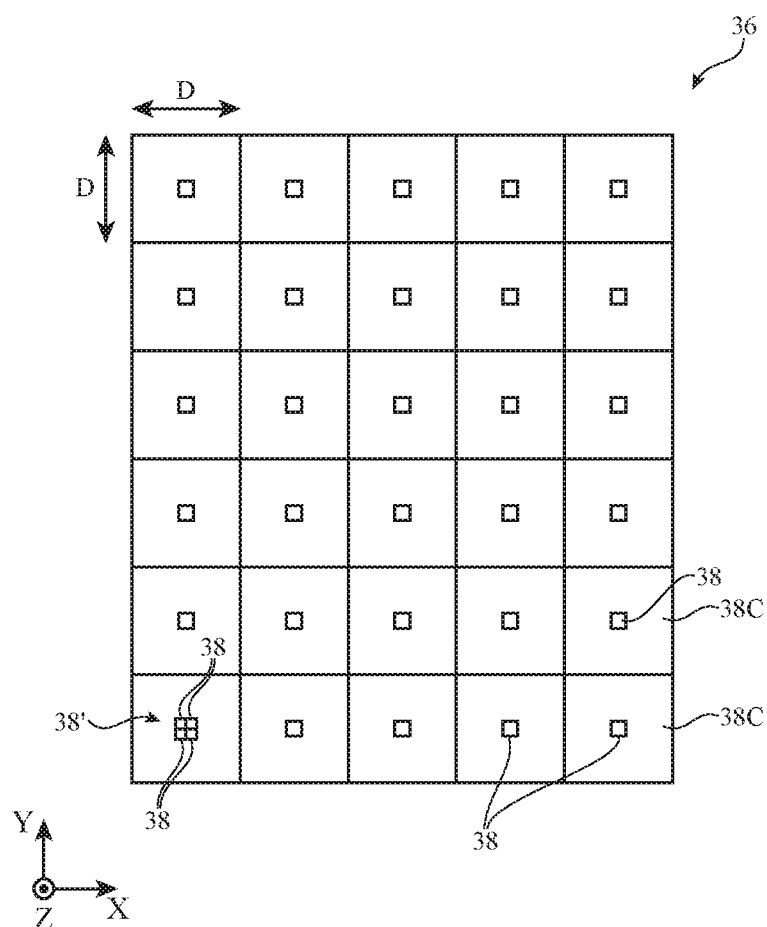
FIG. 3 is a top view of an illustrative light-emitting diode array for a direct-lit backlight unit in accordance with an embodiment.

FIG. 3 is a top view of an illustrative light-emitting diode array for backlight 42. As shown in FIG. 3, light-emitting diode array 36 may contain rows and columns of light-emitting diodes 38. Each light-emitting diode 38 may be associated with a respective cell (tile area) 38C. The length D of the edges of cells 38C may be 2 mm, 18 mm, 1-10 mm, 1-4 mm, 10-30 mm, more than 5 mm, more than 10 mm, more than 15 mm, more than 20 mm, less than 25 mm, less than 20 mm, less than 15 mm, less than 10 mm, or other suitable size. If desired, hexagonally tiled arrays and arrays with light-emitting diodes 38 that are organized in other suitable array patterns may be used. In arrays with rectangular cells, each cell may have sides of equal length (e.g., each cell may have a square outline in which four equal-length cell edges surround a respective light-emitting diode) or each cells may have sides of different lengths (e.g., a non-square rectangular shape). The configuration of FIG. 3 in which light-emitting diode array 36 has rows and columns of square light-emitting diode regions such as cells 38C is merely illustrative.

In some cases, each cell 38C may include a single light-emitting diode. Alternatively, each cell 38C may have a light source that is formed form an array of light-emitting diode dies (e.g., multiple individual light-emitting diodes 38 arranged in an array such as a 2×2 cluster of light-emitting diodes at the center of each cell 38C). For example, light source 38' in the leftmost and lowermost cell 38C of FIG. 3 has been formed from a 2×2 array of light-emitting diodes 38 (e.g., four separate light-emitting diode dies). The diodes 38 in light source 38' may be mounted on a common package substrate, may be mounted on a printed circuit board substrate that extends across array 36, or may be mounted in array 36 using other suitable arrangements. In general, each cell 38C may include a light source 38' with a single light-emitting diode 38, a pair of light-emitting diodes 38, 2-10 light-emitting diodes 38, at least two light-emitting diodes 38, at least 4 light-emitting diodes 38, at least eight light-emitting diodes 38, fewer than five light-emitting diodes 38, or other suitable number of light-emitting diodes. Illustrative configurations in which each cell 38C has a single light-emitting diode 38 may sometimes be described herein as an example. This is, however, merely illustrative. Each cell 38C may have a light source 38 with any suitable number of one or more light-emitting diodes 38.

Light-emitting diodes 38 may be controlled in unison by control circuitry in device 10 or may be individually controlled. Controlling the light-emitting diodes individually may enable the electronic device to implement a local dimming scheme that helps improve the dynamic range of images displayed on pixel array 24 and that potentially reduces the power consumption of the backlight. The dynamic range of a display may be considered the ratio between the light of the highest intensity (e.g., the brightest light) that the display is capable of emitting and the light of the lowest intensity (e.g., the dimmest light) that the display is capable of emitting.

Figure 4:
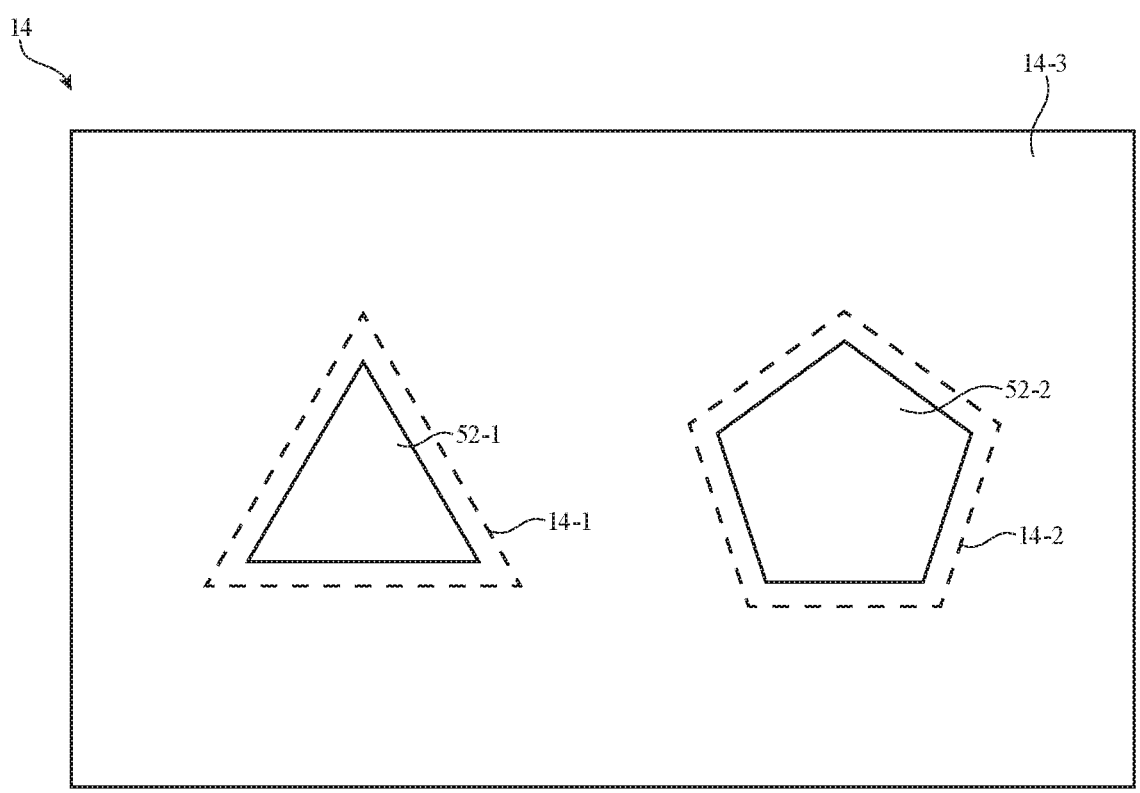
FIG. 4 is a top view of an illustrative display showing how a backlight may have a different brightness in different portions of the display in accordance with an embodiment.

If all of the light-emitting diodes in backlight unit 42 are controlled in unison, the dynamic range of the display may be limited. Consider the example depicted in FIG. 4. In FIG. 4, objects such as objects 52-1 and 52-2 are displayed on display 14 (sometimes referred to as screen 14). In this example, object 52-1 may have a high brightness level. Object 52-2 may have an intermediate brightness level. The background of the display may have a low brightness level. If the light-emitting diodes providing backlight for display 14 in FIG. 4 are controlled in unison, all of the light-emitting diodes may be set to a brightness that is optimized for object 52-1. In this scenario, object 52-1 may be displayed with its intended brightness. However, the background of the display is also receiving backlight with a high brightness optimized for object 52-1. Therefore, the background of the display may appear brighter than desired due to display limitations such as light leakage through the pixels or other limitations, and the dynamic range of the display is lower than desired. Alternatively, all of the light-emitting diodes may be set to a brightness that is optimized for the background of the display. In this scenario, the background may be displayed with its intended brightness. However, object 52-1 is also receiving backlight with a low brightness optimized for the background. Therefore, object 52-1 will appear dimmer than desired and the dynamic range of the display will be lower than desired. In yet another embodiment, the brightness of all of the light-emitting diodes may be set to a brightness that is optimized for object 52-2. In this scenario, object 52-1 will appear dimmer than desired and the background will appear brighter than desired.

Additionally, controlling all of the light-emitting diodes in backlight unit 42 in unison may introduce power consumption limitations. The maximum allowable power consumption of the backlight unit may prevent all of the light-emitting diodes from being operated at a peak brightness level. For example, all of the light-emitting diodes may not be able to emit light with a desired brightness for bright object 52-1 while meeting power consumption requirements.

To summarize, operating all of the light-emitting diodes in the backlight in unison such that the backlight brightness is the same across the display forces trade-offs in the aesthetics of the displayed image. Portions of the display may be dimmer than desired or brighter than desired and the dynamic range across the display will be lower than desired.

To increase the dynamic range of the display (and to allow for peak brightness levels without exceeding power consumption requirements), the light-emitting diodes in backlight unit 42 may be controlled individually. For example, light emitting diodes in region 14-1 of the display may have a high brightness optimized for the high brightness of object 52-1, light-emitting diodes in region 14-2 of the display may have a brightness optimized for the intermediate brightness of object 52-2, and light-emitting diodes in region 14-3 of the display may have a low brightness optimized for the low brightness of the background of the display. In one example, the light-emitting diodes in region 14-1 may operate at a maximum brightness whereas the light-emitting diodes in background region 14-3 may be turned off (e.g., operate at a minimum brightness). Varying the brightness of the light-emitting diodes across the display in this manner increases the dynamic range of the display.

Although varying the brightness of the light-emitting diodes in backlight 42 increases the dynamic range of the display, varying the brightness in this manner presents numerous challenges. In some cases, varying the brightness of the light-emitting diodes may lead to visible artifacts such as flickering or brightness halo. Maximum power consumption issues may need to be accounted for when varying the brightness of the light-emitting diodes. Additional factors such as the display mode, display content, and ambient conditions may also be factors for controlling brightness across the display. The display circuitry described herein is configured to vary brightness of the light-emitting diodes in a backlight while mitigating visible artifacts and taking into account power considerations and other electronic device operating conditions.

Figure 5:
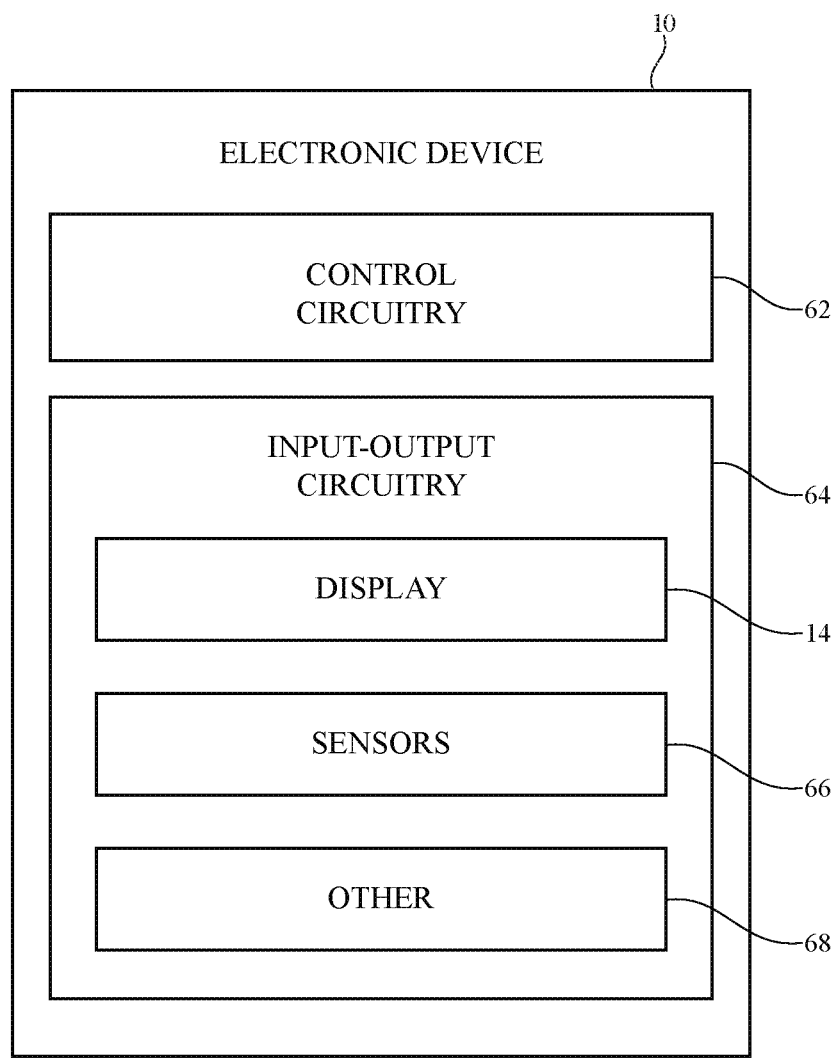
FIG. 5 is a schematic diagram of an illustrative electronic device having a display with a direct-lit backlight unit in accordance with an embodiment.

FIG. 5 is a schematic diagram of an illustrative electronic device with a display and control circuitry for operating the display. As shown in FIG. 5, electronic device 10 may have control circuitry 62. Control circuitry 62 may include storage and processing circuitry for controlling the operation of device 10. Circuitry 62 may include storage such as hard disk drive storage, nonvolatile memory (e.g., electrically-programmable-read-only memory configured to form a solid-state drive), volatile memory (e.g., static or dynamic random-access-memory), etc. Processing circuitry in control circuitry 62 may be based on one or more microprocessors, microcontrollers, digital signal processors, baseband processors, power management units, audio chips, graphics processing units, application-specific integrated circuits, and other integrated circuits. Software code may be stored on storage in circuitry 62 and run on processing circuitry in circuitry 62 to implement control operations for device 10 (e.g., data gathering operations, operations involving the adjustment of components using control signals, operations involved in controlling the display pixels and backlight unit of the display, etc.).

Device 10 may include input-output circuitry 64. Input-output circuitry 64 may be used to allow data to be received by device 10 from external equipment (e.g., a tethered or remote/wireless computer, a portable device such as a handheld device or laptop computer, or other electrical equipment) and to allow a user to provide device 10 with user input. Input-output circuitry 64 may also be used to gather information on the environment in which device 10 is operating. Output components in circuitry 64 may allow device 10 to provide a user with output and may be used to communicate with external electrical equipment. As shown in FIG. 5, input-output circuitry 64 may include a display such as display 14. Display 14 may be used to display images for a user of device 10.

Sensors 66 in input-output devices 64 may include force sensors (e.g., strain gauges, capacitive force sensors, resistive force sensors, etc.), audio sensors such as microphones, touch and/or proximity sensors such as capacitive sensors (e.g., a two-dimensional capacitive touch sensor integrated into display 14, a two-dimensional capacitive touch sensor overlapping display 14, and/or a touch sensor that forms a button, trackpad, or other input device not associated with a display), and other sensors. If desired, sensors 66 may include optical sensors such as optical sensors that emit and detect light, ultrasonic sensors, optical touch sensors, optical proximity sensors, and/or other touch sensors and/or proximity sensors, monochromatic and color ambient light sensors, image sensors, fingerprint sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors, depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, gaze tracking sensors, and/or other sensors. In some arrangements, device 10 may use sensors 66 and/or other input-output devices to gather user input (e.g., buttons may be used to gather button press input, touch sensors overlapping displays can be used for gathering user touch screen input, touch pads may be used in gathering touch input, microphones may be used for gathering audio input, accelerometers may be used in monitoring when a finger contacts an input surface and may therefore be used to gather finger press input, etc.).

If desired, electronic device 10 may include additional components (see, e.g., other devices 68 in input-output devices 12). The additional components may include haptic output devices, audio output devices such as speakers, light-emitting diodes for status indicators, light sources such as light-emitting diodes that illuminate portions of a housing and/or display structure, other optical output devices, and/or other circuitry for gathering input and/or providing output. Device 10 may also include a battery or other energy storage device, connector ports for supporting wired communicate on with ancillary equipment and for receiving wired power, and other circuitry.

Figure 6:
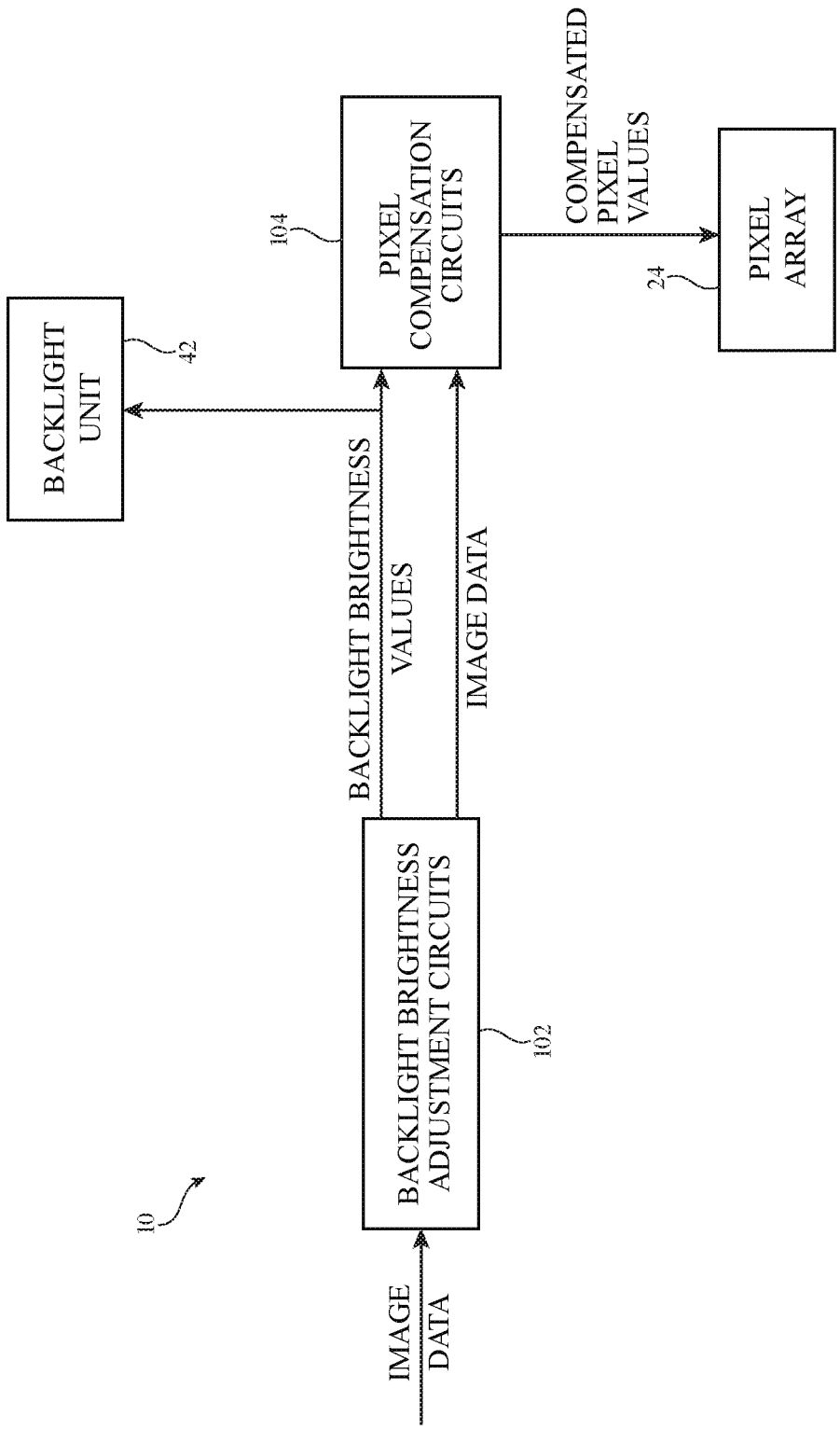
FIG. 6 is a schematic diagram of an illustrative electronic device showing control circuitry that may be used to vary backlight brightness across a display in accordance with an embodiment.

FIG. 6 is a schematic diagram of an electronic device with control circuitry for implementing a variable backlight brightness scheme. FIG. 6 provides a high-level view of the circuitry used to operate a display with varying backlight brightness. As shown in FIG. 6, control circuitry 62 in the electronic device may include both backlight brightness adjustment circuits 102 and pixel compensation circuits 104.

Backlight brightness adjustment circuits 102 may receive image data and output corresponding backlight brightness values associated with the image data. For example, the backlight may include a plurality of light-emitting diodes, each light-emitting diode arranged a respective cell. The backlight brightness adjustment circuits may analyze the image data and determine an optimal brightness for each light-emitting diode in the backlight. The output backlight brightness values are therefore an array of brightness values corresponding to the array of light-emitting diodes. The backlight brightness adjustment circuits may take many factors into account when determining the brightness values for each light-emitting diode in the backlight unit, as will be discussed in greater detail in connection with the subsequent figures.

The backlight brightness values from backlight brightness adjustment circuits 102 are provided to backlight unit 42. Backlight unit 42 may adjust the brightness of the light-emitting diodes in the backlight based on the received backlight brightness values.

The backlight brightness values may also be provided to pixel compensation circuits 104 in FIG. 6. As shown in FIG. 6, pixel compensation circuits 104 receive the backlight brightness values and the image data. The image data may include a corresponding value for every pixel in the pixel array. However, each pixel value may be adjusted for the brightness of the backlight that pixel receives. Each pixel value may therefore be compensated to account for the backlight brightness associated with that pixel. The compensated pixel values are then provided to pixel array 24 in order to be displayed by the pixel array.

Ultimately, operation of the display with a locally adjustable backlight may be broken down into the two steps depicted in FIG. 6. First, the desired backlight brightness levels across the display are generated based on the image data (and other factors). Second, the image data is adjusted to compensate for the variations in the backlight brightness levels. However, as shown in the detailed schematic diagram of FIG. 7, the control circuitry may include a number of circuits to mitigate artifacts caused by the varying backlight levels and to take into account power considerations and other electronic device operating conditions when setting the adjustable backlight brightness levels.

Figure 7:
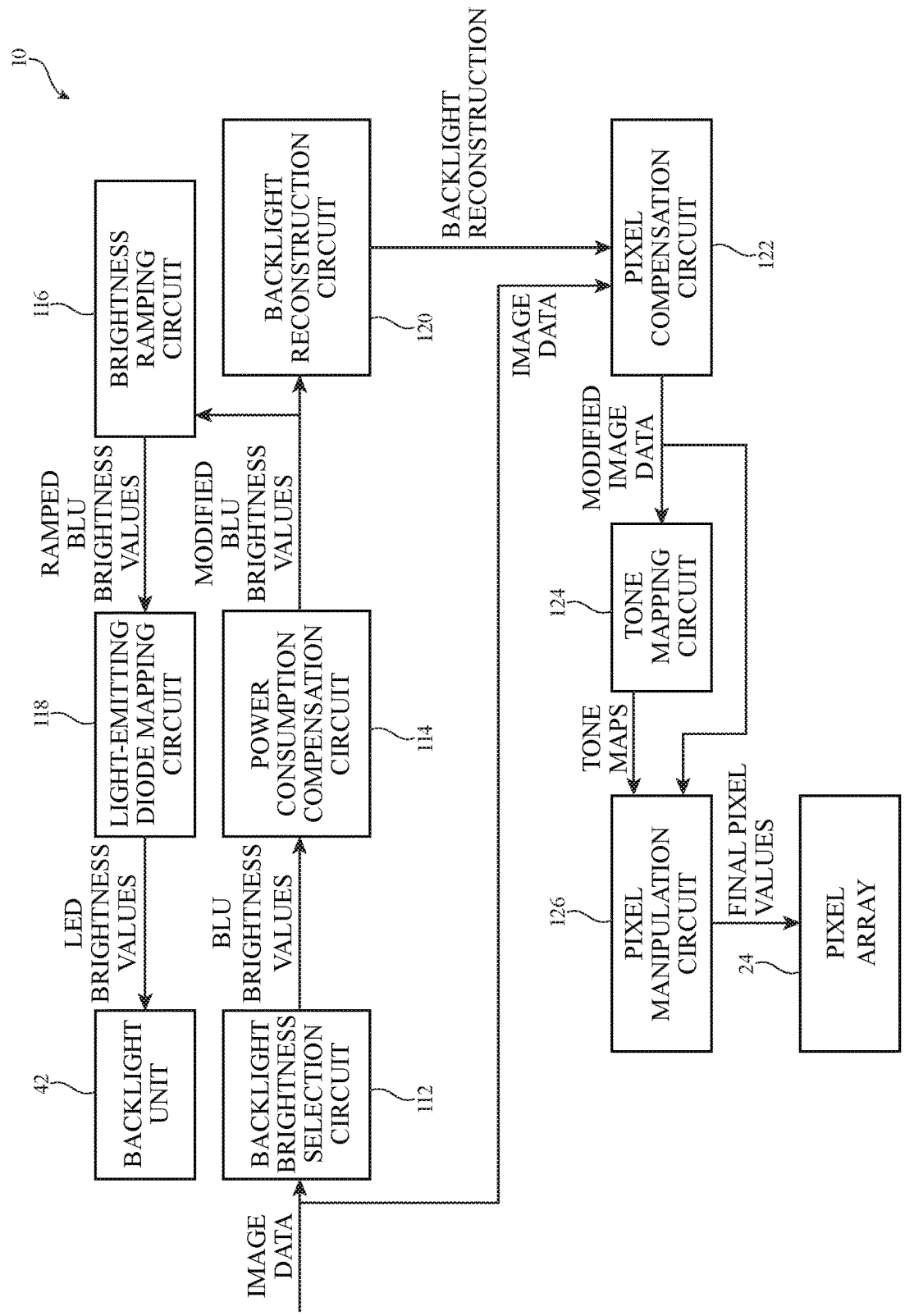
FIG. 7 is a schematic diagram of an illustrative electronic device showing a detailed view of control circuitry that may be used to vary backlight brightness across a display and compensate pixel values for the varied backlight brightness in accordance with an embodiment.

As shown in FIG. 7, backlight brightness selection circuit 112 may receive image data. The backlight brightness selection circuit may output backlight brightness values (e.g., one brightness value for each light-emitting diode in the backlight) based at least on the image data. The backlight brightness selection circuit may account for many factors when selecting the brightness values for the light-emitting diodes. First, the brightness values may be selected based on the content itself. For example, if the image data indicates that an area of the display should be very bright, the corresponding light-emitting diodes in that area may have a high brightness. If the image data indicates that an area of the display should be dim, the corresponding light-emitting diodes in that area may have a low brightness.

The backlight brightness selection circuit may account for additional factors in addition to the content of the image. For example, the backlight brightness selection circuit may select brightness values in a way that mitigates visible artifacts on the display. One type of artifact that may be visible during operation of a locally adjustable backlight is backlight flickering. The backlight brightness may be updated with each frame of image data (e.g., with each display frame). In some situations, this may cause undesired visible flickering in the backlight (due to the backlight levels changing rapidly in a manner that is detectable to the user). The backlight brightness selection circuit may select backlight brightness values that reduce visible flickering in the backlight.

Another type of artifact that may be visible during operation of the locally adjustable backlight is visible 'halo.' Consider an example where a very bright object is displayed on a dark background. The light-emitting diode(s) for the bright portion of the image may have a corresponding high brightness. The light-emitting diodes for the dark background may have a corresponding low brightness. Despite the low brightness of the light-emitting diodes in the dark background, bright light from the brightly lit light-emitting diodes may leak into the dark background. As a result, the dark background may have a portion that surrounds the brightly lit object that is detectably brighter than the remaining portion of the dark background. This undesirably bright ring around the bright object may be referred to as a halo or a halo effect.

To reduce the halo effect, the peak brightness of the backlight light-emitting diodes may be reduced. This may reduce visible halos at the cost of sacrificing dynamic range of the display. In some situations, the peak brightness of the backlight may be maintained, even if visible halos will consequently be present. The backlight brightness selection circuit may decide to prioritize either maximizing the peak brightness of the backlight or minimizing halos in the displayed image and select backlight brightness values accordingly.

Ultimately, backlight brightness selection circuit 112 may output a set of backlight unit (BLU) brightness values to power consumption compensation circuit 114. The backlight unit brightness values output from backlight brightness selection circuit 112 may be target values that do not take into account the power limitations of the electronic device. Power consumption compensation circuit 114 may ensure that enough power is available to use the backlight brightness values from the backlight brightness selection circuit.

Electronic device 10 may only be able to use a finite amount of power at any given time. Therefore, the electronic device may have a maximum allowable power consumption that is allotted to operating the display backlight. Power consumption compensation circuit 114 may estimate the power consumption associated with operating the backlight using the target brightness values received from selection circuit 112. If the estimated power consumption is less than the maximum allowable power consumption, the brightness values may be output from the power consumption compensation circuit without modification. However, if the estimated power consumption is greater than the maximum allowable power consumption, the brightness values may be adjusted.

Power consumption compensation circuit 114 may take into account both static power consumption considerations and dynamic power consumption considerations. Static power consumption considerations may include the amount of power consumed by a single frame of backlight brightness values. Circuit 114 may estimate the amount of power consumed by the light-emitting diodes in a given frame and ensure the amount of power does not exceed the maximum allowable power consumption. Dynamic power consumption considerations must also be taken into account by the power consumption compensation circuit. To demonstrate dynamic power consumption considerations, consider an example where the top of half of the display is operated with a high brightness and the bottom half of the display is operated with a low brightness. Each frame, analyzed alone (statically), may have an estimated power consumption that is less than the maximum allowable power consumption. However, due to the manner in which the light-emitting diodes are operated, the aforementioned sequence of frames may exceed maximum allowable power consumption. Circuit 114 may therefore estimate the amount of power consumed by the light-emitting diodes based on the brightness values for the current frame and one or more previous frames to ensure the amount of power does not exceed the maximum allowable power consumption.

If the estimated power consumption associated with the target brightness values exceeds the maximum allowable power consumption, the brightness values may be modified. The brightness values may be scaled evenly, meaning that all of the brightness values (both low and high) will be reduced proportionally. Alternatively, the brightness values may be clipped, meaning that the high brightness values will be reduced but the low brightness values will be unchanged. The power consumption compensation circuit may take into account many factors when deciding how to modify the brightness values to ensure power consumption requirements are met.

Power consumption compensation circuit 114 may ultimately output modified backlight brightness values. The modified brightness values may be received by both backlight reconstruction circuit 120 and brightness ramping circuit 116.

Brightness ramping circuit 116 may be used to ramp each light-emitting diode between a brightness level of a previous frame and a current brightness level. The light-emitting diodes of the backlight may have a higher refresh rate than the pixels in the pixel array. In other words, when the transmittance of the pixels is changed for a new image frame, the layer of liquid crystal material in pixel array 24 may take a first amount of time to update from the previous transmittance to the new transmittance. The light-emitting diodes of the backlight, meanwhile, may update in a second amount of time that is quicker than the first amount of time. Therefore, to avoid visible artifacts associated with the light-emitting diodes updating faster than the liquid crystal layer, the brightness of the light-emitting diodes may be gradually changed between old brightness levels and new brightness levels. Brightness ramping circuit 116 may determine how to ramp the brightness of the light-emitting diodes between the old brightness levels and the new brightness levels.

The ramped backlight brightness levels may be output to light-emitting diode mapping circuit 118. The ramped backlight brightness levels received by mapping circuit 118 may be ideal or normalized brightness levels. For example, each brightness level may be a value between 0 and 1, with 0 being 'off' and 1 being the maximum possible brightness. However, in practice, the light-emitting diodes of the backlight unit receive data voltage at a gate terminal of a drive transistor to control brightness. The light-emitting diodes may also have variations that need to be accounted for. For example, two different data voltages may need to be provided to two different light-emitting diodes to achieve the same brightness (due to the variations between the light-emitting diodes). Light-emitting diode mapping circuit 118 accounts for these variations and determines actual values (voltages) that may be used to achieve the desired brightness in the light-emitting diodes. The light-emitting diode brightness values are then provided to backlight unit 42 to update the brightness of the light-emitting diodes in the backlight unit.

The modified brightness values from power consumption compensation circuit 114 may also be received by backlight reconstruction circuit 120. Backlight reconstruction circuit 120 may use the received modified brightness values to simulate the actual backlight brightness across the display (accounting for the spreading and mixing of light from the light-emitting diodes of the backlight). Backlight reconstruction circuit 120 may use point spread functions to simulate the backlight brightness across the display based on the brightness of each light-emitting diode. Backlight reconstruction circuit 120 may output a backlight reconstruction (sometimes referred to as simulated backlight reconstruction) that includes a brightness value associated with each pixel in pixel array 24.

Pixel compensation circuit 122 may receive image data and the backlight reconstruction from backlight reconstruction circuit 120. The pixel compensation circuit may modify the image data based on the received backlight reconstruction. As an example of how the image data may be modified based on the backlight reconstruction, consider a given pixel with an initial pixel value (e.g., transmittance) of 0.5 that is associated with a full backlight brightness (e.g., a backlight brightness of 1 on a scale between 0 and 1). Backlight brightness selection circuit 112 may modify the backlight brightness for a light-emitting diode that provides backlight for the given pixel. Pixel compensation circuit 122 may receive a backlight reconstruction that indicates that the given pixel will ultimately receive backlight with a brightness of 0.5. The pixel compensation circuit may divide the initial pixel value by the brightness from the backlight reconstruction (e.g., 0.5/0.5=1). The resulting transmittance of 1 may be the modified pixel value for the given pixel. To summarize, the pixel compensation modifies the image data so that the light emitted from the given pixel (e.g., 50% brightness and 100% transmittance) matches the initially provided data (e.g., 100% brightness and 50% transmittance) despite the varied backlight. This compensation may be performed for all of the image data. Pixel compensation circuit 122 outputs modified image data that accounts for the varied backlight across the display.

Tone mapping engine 124 may receive the modified image data from pixel compensation circuit 122 and generate corresponding tone maps for the image data. The tone mapping engine may be used to reduce washout and preserve local contrast in the displayed image. There are numerous possible ways to generate the tone maps using the tone mapping circuit. In one illustrative embodiment, the pixels may be arranged in different groups (e.g., of more than twenty pixels, more than ten pixels, more than fifty pixels, between ten and one hundred pixels, less than thirty pixels, etc.). A representative tone map may be generated for each group. These tone maps are then output from the tone mapping circuit 124.

Pixel manipulation circuit 126 may receive the tone maps from tone mapping circuit 124. Pixel manipulation circuit 126 may also receive image data (e.g., the modified image data from pixel compensation circuit 122). Pixel manipulation circuit may adjust the image data based on the received tone maps. In one illustrative example, bilinear interpolation may be used between the four closest tone maps to adjust the value of a given pixel. Pixel manipulation circuit 126 may output final pixel values that are adjusted based on the tone maps. The final pixel values are provided to pixel array 24. In one example, the final pixel values are provided to the pixel array using display driver circuitry within the display.

In FIG. 7, backlight brightness selection circuit 112, power consumption compensation circuit 114, brightness ramping circuit 116, and light-emitting diode mapping circuit 118 may all be considered backlight brightness adjustment circuits (e.g., backlight brightness adjustment circuits 102 in FIG. 6). Backlight reconstruction circuit 120, pixel compensation circuit 122, tone mapping circuit 124, and pixel manipulation circuit 126 may all be considered pixel compensation circuits (e.g., pixel compensation circuits 104 in FIG. 6).

In one possible embodiment, the circuitry of FIG. 7 may operate using a frame buffer. For example, backlight brightness selection circuit may receive input image data and select the backlight brightness values as described in connection with FIG. 7. Circuits 114, 116, and 118 may make further adjustments to the brightness values. Ideally, the input image data received by circuitry 112 would be displayed on the display (with any requisite modifications) at the same time that the backlight brightness values calculated using the input image data are used in the backlight. However, performing the steps to determine and adjust the backlight brightness values (as well as modify the pixel values) takes time. In some circumstances, it may not be possible to determine and provide the backlight brightness values and the pixel values within one frame time. In these situations, a frame buffer of one or more frames may optionally be used to allow sufficient time for the desired processing. However, including a frame buffer may introduce additional memory demands and may cause undesired user interaction latency.

Figure 8:
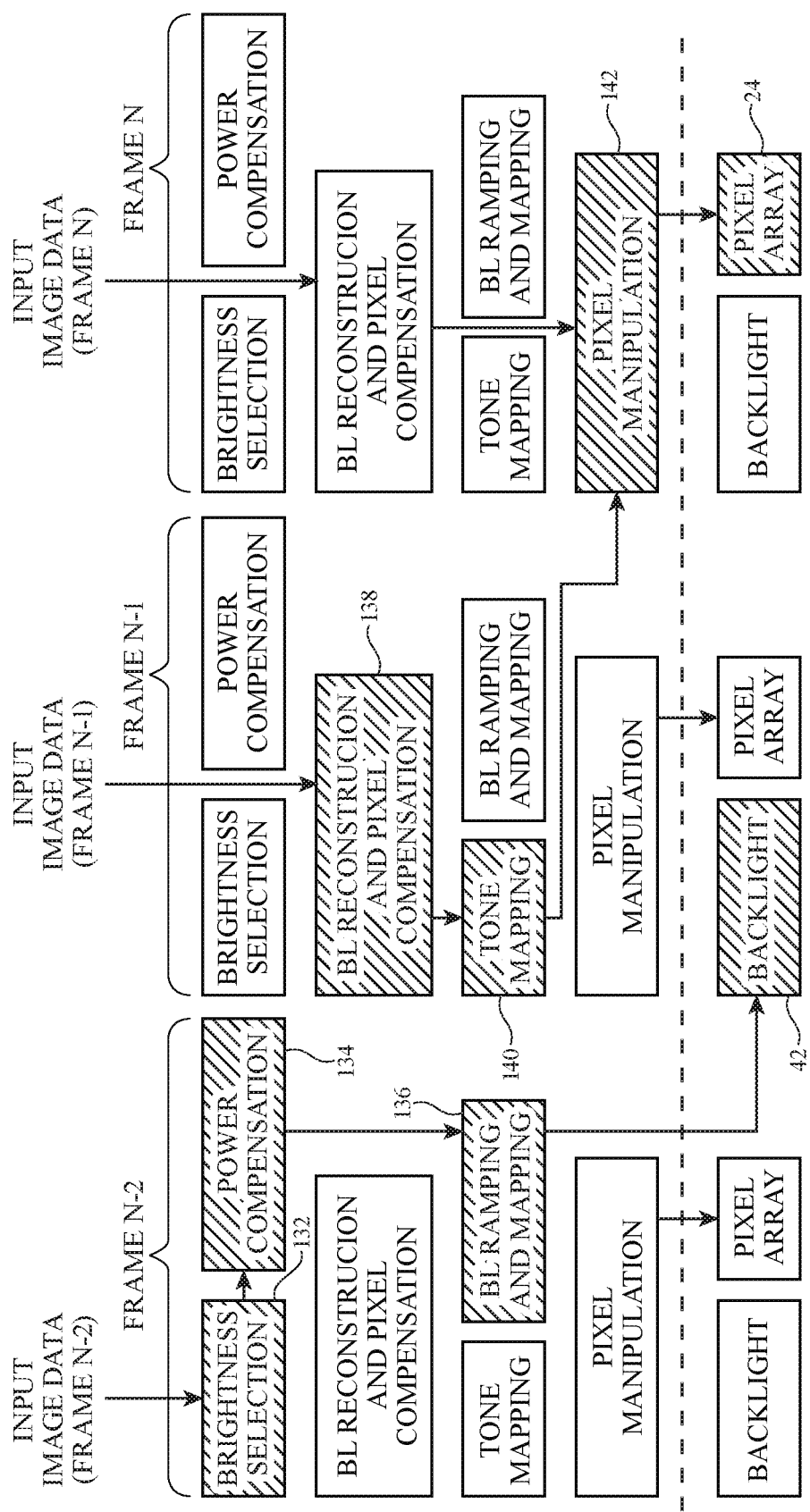
FIG. 8 is a diagram of illustrative steps for operating an electronic device having a display with a direct-lit backlight unit showing how a frame delay may be used while varying backlight brightness across the display and compensating pixel values for the varied backlight brightness in accordance with an embodiment.

Instead of a frame buffer, one or more frame delays may be used in the display pipeline processing. FIG. 8 is a diagram showing how one or more frame delays may be used in operation of an electronic device of the type shown in FIG. 7. As shown in FIG. 8, brightness selection 132 (e.g., by backlight brightness selection circuit 112) may occur during frame N−2 using input image data for frame N−2. Power compensation 134 may then be performed using the brightness values generated during brightness selection. Power compensation 134 may also occur (e.g., using the power consumption compensation circuit 114) during frame N−2. Backlight ramping and sloping 136 may also occur (e.g., using circuits 116 and 118) during frame N−2. However, although the backlight values generated at steps 132, 134 and 136 are based on the data for frame N−2, the backlight values are provided to backlight 42 and actually used by backlight 42 during frame N−1. In other words, there is a frame delay between when the backlight values are generated (based on current image data) and when the backlight values are actually used in the light-emitting diodes of the backlight. Said another way, the brightness values for the light-emitting diodes in a current display frame are based on image data from the previous display frame. The power compensation step 134 and backlight ramping and mapping step 136 may occur during a vertical blanking period of the display frame.

Backlight reconstruction and pixel compensation 138 is performed (e.g., by circuits 120 and 122) during frame N−1 using the backlight values from step 134 and input image data for frame N−1. Tone mapping 140 is then performed (e.g., by circuit 124) based on the simulated backlight and compensated pixels from step 138. Pixel manipulation is then performed at step 142 using the tone maps from step 140 and the compensated pixel data for frame N (e.g., the input image data for frame N is compensated during step 138 in frame N then manipulated during step 142). The manipulated image data is provided to pixel array 24. Although the tone maps generated at step 140 are based on the input image data from frame N−1 (and the simulated backlight which is based on backlight levels generated during frame N−2), the tone maps are actually used at step 142 in frame N. In other words, there is a frame delay between when the tone maps are generated (based on current image data) and when the tone maps are actually used to manipulate the pixel data that is provided to pixel array 24. Said another way, the tone maps used to manipulate image data for a current display frame are generated in the previous display frame.

In FIG. 8, various steps are highlighted in frames N−2, N−1, and N to show the frame delays involved in the pipeline of a locally adaptive direct-lit backlit display. However, it should be understood that each step is performed in every frame. For example, in frame N−2, the backlight receives brightness values to be used by the light-emitting diodes from the ramping and mapping step of frame N−3. In frame N−2, pixel manipulation is performed on the compensated image data for frame N−2 using tone maps generated based on the pixel data from frame N−3.

Figure 9:
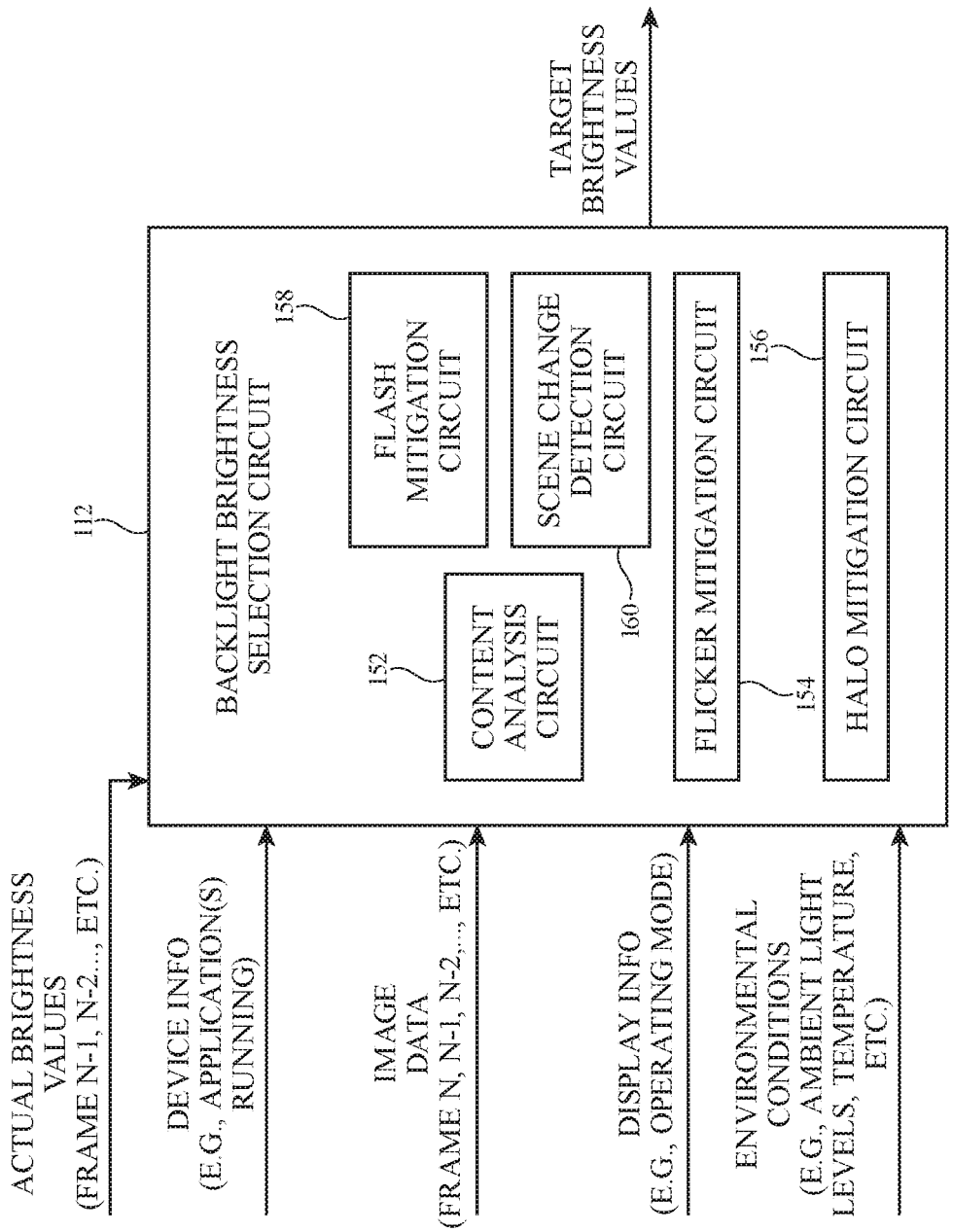
FIG. 9 is a schematic diagram of an illustrative backlight brightness selection circuit for an electronic device with a locally adaptable direct-lit backlight in accordance with an embodiment.

FIG. 9 is a schematic diagram of the backlight brightness selection circuit included in FIG. 7. As shown in FIG. 9, backlight brightness selection circuit 112 may include content analysis circuit 152, flicker mitigation circuit 154, halo mitigation circuit 156, flash mitigation circuit 158, and scene change detection circuit 160.

Backlight brightness selection circuit 112 may receive various information to assist with selecting target brightness values for the light-emitting diodes of the backlight. As shown in FIG. 9, the backlight brightness selection circuit may receive image data from one or more image frames. The image data may include a corresponding value for every pixel in the pixel array of the display.

The backlight brightness selection circuit may also receive information on the actual brightness values used by the light-emitting diodes in previous image frames. This information may be used to help mitigate flickering, detect scene changes, etc.

The backlight brightness selection circuit may also receive device information regarding electronic device 10. The device information may include information such as which software applications are currently operating on the electronic device. The device information may identify a current user of the electronic device and/or any associated user preferences. Any other desired information regarding the electronic device may optionally be provided to the backlight brightness selection circuit.

The backlight brightness selection circuit may also receive display information such as a display operating mode and information on environmental conditions. The information on environmental conditions may include information such as the ambient light level or a temperature. The temperature may be an ambient temperature (e.g., the ambient temperature of the environment in which the electronic device is operating) or an internal temperature (e.g., a temperature associated with the display). The environmental conditions may also include information regarding the location of the electronic device or information such as the time of day.

Content analysis circuit 152 may determine light-emitting diode brightness values based on a current frame of image data. The content analysis circuit may use downsampling or any other desired image processing techniques to determine an optimal value for each light-emitting diode in the backlight. This analysis may be based solely on the current frame of image data (e.g., frame N). However, the additional circuits in the backlight brightness selection circuit may use the other received information to influence the light-emitting diode brightness values that are ultimately output from the backlight brightness selection circuit.

For example, flicker mitigation circuit 154 may be configured to mitigate visible artifacts caused by rapid changes in the backlight brightness levels. The flicker mitigation circuit may compare target brightness values from content analysis circuit 152 to brightness values from one or more previous frames. For each light-emitting diode in the backlight, the flicker mitigation circuit may use a temporal filter to determine whether to lend more weight to the target brightness level (which may optimize the appearance of the image but may have a risk of flickering) or the previous brightness level (which reduces the risk of flickering). The flicker mitigation circuit will be discussed in greater detail in connection with FIG. 10.

Halo mitigation circuit 156 may analyze the brightness values from content analysis circuit 152 and assess the risk of the halo in the displayed image. To reduce detected halo effect, the peak brightness of the light-emitting diodes in the backlight may be reduced. This may reduce visible halos at that cost of sacrificing dynamic range in the display. Alternatively, in some situations the peak brightness of the backlight may be maintained, even if visible halos will consequently be present. Halo mitigation circuit 156 may decide to prioritize maximizing the peak brightness of the backlight or minimizing halos in the displayed image and modify the backlight brightness values from content analysis circuit 152 accordingly.

Various information may be used by halo mitigation circuit 156 in determining whether to prioritize peak brightness or halo mitigation. For example, the received device information may be used to determine whether to prioritize peak brightness or halo mitigation. Consider an example where the device information identifies that a photo-editing application is being used by the electronic device. In this type of application, in which photographs are likely to be presented, a greater emphasis may be placed on halo mitigation to ensure the accurate appearance of the displayed photographs. In another example, the device information may identify that a messaging application is being used by the electronic device. In this type of application, the displayed content may be likely to be user-interface based content (e.g., text that the user is receiving or sending). In this type of use-case, a greater emphasis may be placed on peak brightness (as the halo effect will be less noticeable and/or not detract from the user experience).

The display information received by the backlight brightness selection circuit may also be used to assess whether to prioritize peak brightness or halo mitigation. When the display is operating in a first mode, the halo mitigation circuit may prioritize beak brightness at the risk of visible halo effects. When the display is operating in a second mode that is different than the first mode, the halo mitigation circuit may prioritize halo mitigation (even if dynamic range is sacrificed).

The received environmental conditions such as the ambient light levels, temperature readings, time of day, and device location may also be used to assess whether to prioritize peak brightness or halo mitigation. For example, in low ambient light conditions, the halo mitigation circuit may prioritize halo mitigation (even if dynamic range is sacrificed). In high ambient light level conditions, the halo mitigation circuit may prioritize beak brightness at the risk of visible halo effects.

It should be understood that the decision of prioritizing peak brightness or halo mitigation may vary spatially across the display. For example, in a first portion of the display peak brightness may be prioritized and in a second portion of the display halo mitigation may be prioritized. Regions of the display of any desired size may be evaluated individually.

Consider an example where a first half of the display is used to present a photograph or video and the second half of the display is used to present text (e.g., a user-interface) associated with the photograph or video. In this case, halo mitigation circuit 156 may adjust the brightness values of the backlight differently in the first and second halves of the display. Because the first half of the display is use to present a photograph or video (e.g., photograph-based content), halo mitigation may be prioritized in the first half of the display by the halo mitigation circuit. On the other hand, because the second half of the display is displaying a user-interface, peak brightness may be prioritized in the second half of the display by the halo mitigation circuit.

To mitigate the halo effect in one or more areas of the display, halo mitigation circuit 156 may adjust the backlight brightness of the light-emitting diodes. In one example, halo mitigation circuit 156 may have a number of stored brightness curves that scale desired display brightness values according to a curve. Halo mitigation circuit 156 may select a brightness curve for each light-emitting diode (or group of light-emitting diodes) in the backlight based on all of the aforementioned factors. Certain curves may favor maximizing peak brightness (at the expense of halo mitigation) whereas other curves may favor halo mitigation (at the expense of peak brightness). To summarize, halo mitigation circuit may have one or more parameters that may be adjusted based on the received information (e.g., to prioritize halo mitigation or to prioritize peak brightness). In general, the halo mitigation circuit may take any desired action to curtail brightness in the light-emitting diodes of backlight 42.

Flash mitigation circuit 158 may prevent a visible artifact such as a flash from occurring in certain display scenarios. For example, a large area of black pixels may be displayed on the display in a first frame. Subsequently, gray pixels may be displayed in that area of the display in a second frame. In this example, there may be a visible artifact (e.g., a flash) caused by the frame delay described in connection with FIG. 8. When image data is received at the backlight brightness selection circuit that indicates a risk of a flash occurring (e.g., if a large area of black pixels is present in the image data), flash mitigation circuit 158 may take action to prevent flashing from occurring. As one possible illustrative mitigating action, flash mitigation circuit 158 may send a signal to backlight reconstruction circuit 120 indicating a flash risk is present. In response to receiving the signal indicating the flash risk, the backlight reconstruction circuit 120 may simulate a backlight that differs from the actual backlight values generated by the backlight brightness selection circuit. The backlight reconstruction circuit 120 essentially overrides the received brightness values and instead simulates the backlight levels in a way that will prevent the flash from occurring.

Scene change detection circuit 160 may assess the information received by the backlight brightness selection circuit to determine if a scene change has occurred on the display. A scene change may occur when the majority of the content on the display changes. Scene change detection circuit 160 may compare the image data of the current frame to the image data of a previous frame. If the image data of the current frame is very different than the image data of the previous frame, a scene change may be flagged. Scene change detection circuit 160 may instead compare the target light-emitting diode brightness values from content analysis circuit 152 to the light-emitting diode brightness values of a previous frame. If the light-emitting diode brightness values are very different than the image data of the previous frame, a scene change may be flagged. The light-emitting diode brightness values may be flagged as being similar if the previous value and current value are within 1% of each other, within 5% of each other, within 10% of each other, etc. A scene change may be positively identified if the percentage of light-emitting diodes flagged as similar exceeds a given threshold percentage (e.g., 50%, 70%, 90%, 95%, less than 60%, more than 40%, more than 75%, etc.).

Scene change detection circuit 160 may take various actions in response to identifying a scene change scenario. For example, scene change detection circuit 160 may override flicker mitigation circuit 154, flash mitigation circuit 158, and/or halo mitigation circuit 156 and instead have the brightness values from content analysis circuit 152 output as the target brightness values. This may help ensure that the light-emitting diode brightness values are updated to fit the new scene as soon as possible (as opposed to taking actions to mitigate visible artifacts that, because of the scene change, may not be perceptible to the user). Scene change detection circuit 160 may also change parameters of flicker mitigation circuit 154, flash mitigation circuit 158, and/or halo mitigation circuit 156 to prioritize quickly updating the light-emitting diode brightness values to fit the new scene.

Figure 10:
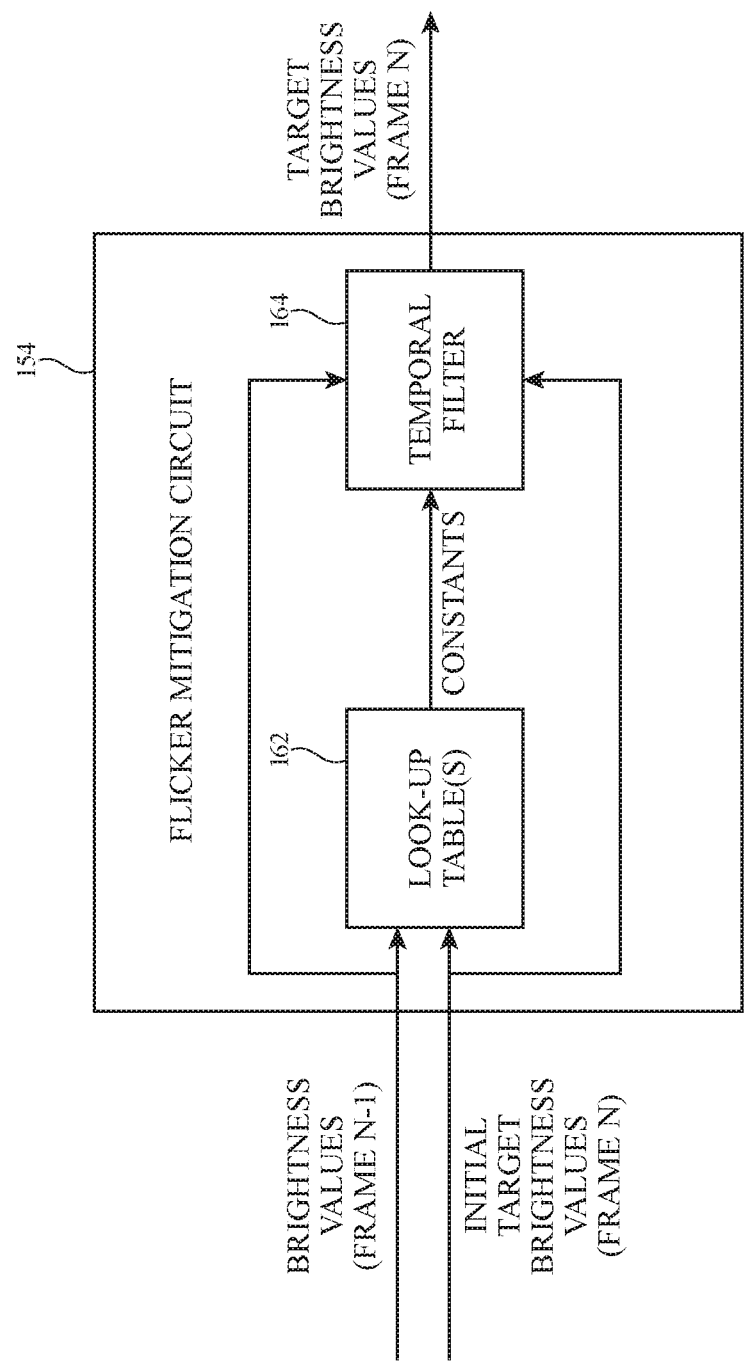
FIG. 10 is a schematic diagram of an illustrative flicker mitigation circuit that may be included in the backlight brightness selection circuit of FIG. 9 in accordance with an embodiment.

FIG. 10 is a schematic diagram showing the flicker mitigation circuit of FIG. 9. As shown in FIG. 10, flicker mitigation circuit 154 may include a look-up table 162 and a temporal filter 164. Temporal filter 164 may be an infinite impulse response (IIR) filter that outputs a brightness value (e.g., a target brightness value for frame N) based on a previous brightness value (e.g., a brightness value used in frame N−1) and an initial target brightness value (e.g., for frame N). The temporal filter may determine the output target brightness values using a formula with constants. The constants may, for example, determine how much weight is lent to the previous brightness value as opposed to the new target brightness value in determining the output target brightness value. Temporal filter 164 may use a formal of: $y_n = y_{n-1} \cdot a + x_n \cdot b$, where $y_n$ is the output target brightness value, $y_{n-1}$ is the brightness value used in the previous frame, $x_n$ is the initial target brightness value, and a and b are constants. The sum of a and b may be equal to 1 (i.e., a+b=1). Therefore, when a>b, more weight will be assigned to the previous backlight brightness level (and the backlight will be slower to update). When b>a, more weight will be assigned to the new backlight brightness level (and the backlight will update quickly).

Look-up table(s) 162 may be used to determine the constants a and b for the temporal filter based on the brightness values from the previous frames and the initial target brightness values. The look-up table may, for example, have constants associated with differences between the brightness values from the previous frames and the initial target brightness values. When the difference is high, constant b may be higher than constant a to ensure the brightness level is updated quickly to the new brightness level (which is much different than the previous brightness level). When the difference is low, constant a may be higher than constant b. This may prevent detectable flickering in the backlight.

Flicker mitigation circuit 154 may use different look-up tables or otherwise modify the output target brightness values based on other information received by the brightness selection circuit. For example, the flicker mitigation circuit may have different look-up tables to be used in different operating modes of the display or may use different look-up tables depending upon the type of content in that portion of the display. The device information, display information, image data, and environmental conditions described in connection with FIG. 9 may all be used by flicker mitigation circuit 154 to select an appropriate look-up table or otherwise modify the output target brightness values.

Figure 11:
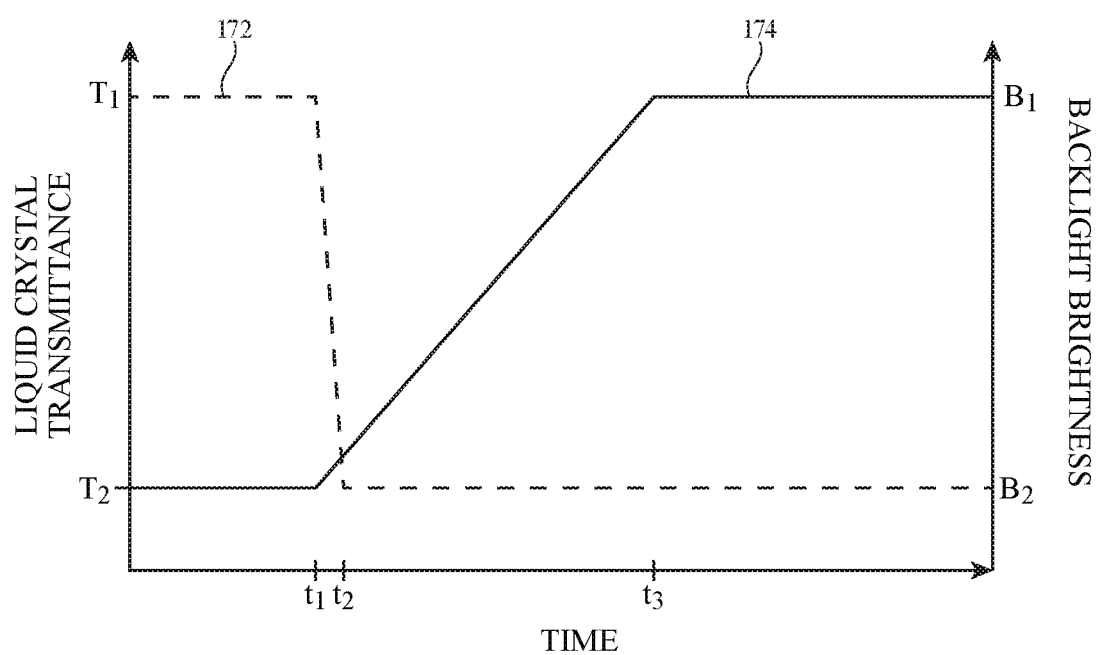
FIG. 11 is a graph of liquid crystal transmittance and backlight brightness versus time in an example where backlight ramping is not used in accordance with an embodiment.

As discussed in connection with FIG. 7, brightness ramping circuit 116 may be used to ramp each light-emitting diode between a brightness of a previous frame and a brightness of a given frame. FIG. 11 is a graph of liquid crystal transmittance and backlight brightness versus time in an example where the backlight brightness is not ramped (i.e., if brightness ramping circuit 116 was not present). As shown in FIG. 11, the liquid crystal transmittance over time follows series 174. Before time $t_1$, the liquid crystal transmittance may be at a level $T_2$. Then, at time $t_1$, the liquid crystal transmittance may be updated from $T_2$ to $T_1$ (e.g., in accordance with a new frame of image data). However, the liquid crystal layer may not be able to instantly update from the first state (associated with transmittance $T_2$) to the second state (associated with transmittance $T_1$). As shown in FIG. 11, even when starting the update at $t_1$, the liquid crystal layer may not be updated to transmittance $T_1$ until time $t_3$.

The light-emitting diodes of the backlight, meanwhile, may have a higher refresh rate than the pixels in the pixel array. The backlight brightness over time may follow series 172. As shown in FIG. 11, before time $t_1$, the backlight brightness may be at brightness $B_1$. Then, at time $t_1$, the backlight brightness may be updated to brightness level $B_2$. Because the light-emitting diodes of the backlight can update faster than the liquid crystal layer of the pixel array, the light-emitting diodes may reach the updated brightness level before the liquid crystal layer reaches the updated transmittance level. In the example of FIG. 11, the backlight reaches brightness level $B_2$ at time $t_2$ (which is much before $t_3$ when the transmittance is fully updated). In this scenario, because the backlight ramping circuit is not present, light would be emitted from the display with a different brightness than desired due to the backlight quickly updating before the liquid crystal layer can fully update.

Figure 12:
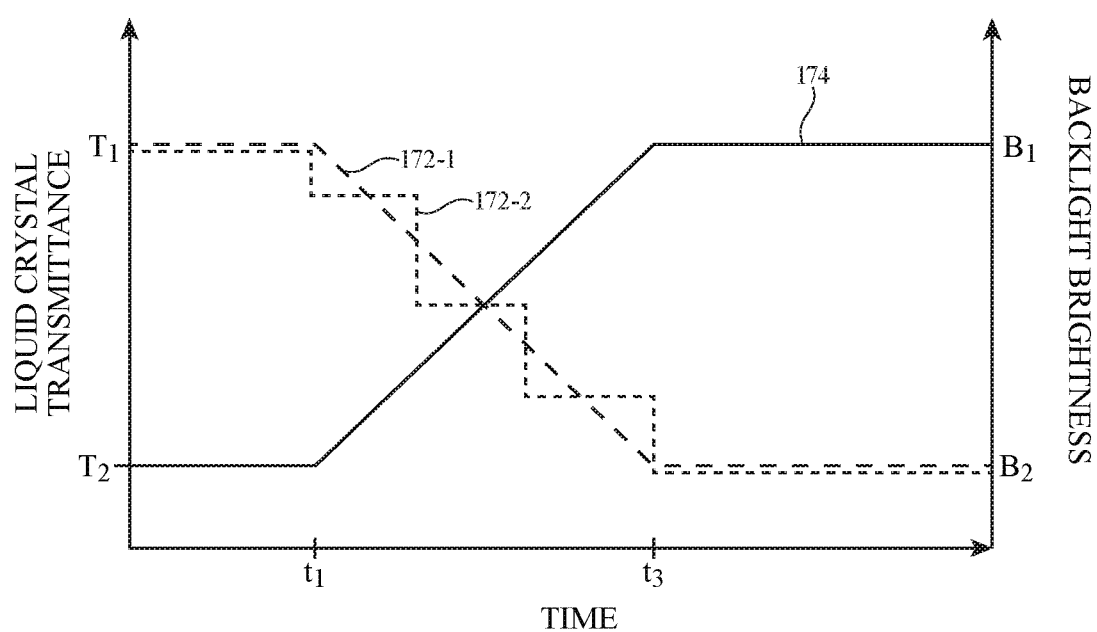
FIG. 12 is a graph of liquid crystal transmittance and backlight brightness versus time in an example where backlight ramping is used in accordance with an embodiment.

To avoid visible artifacts associated with the light-emitting diodes updating faster than the liquid crystal layer, the brightness of the light-emitting diodes may be ramped between old brightness levels and new brightness levels. Brightness ramping circuit 116 may determine how to ramp the brightness of the light-emitting diodes between the old brightness levels and the new brightness levels. FIG. 12 is graph of liquid crystal transmittance and backlight brightness versus time in an example where the backlight brightness is ramped. The liquid crystal transmittance over time follows series 174, as in FIG. 11. In FIG. 12, however, the backlight brightness is ramped as shown by series 172-1 and series 172-2. As shown, the backlight ramping circuit 116 may gradually change the backlight brightness from $B_1$ to $B_2$ between $t_1$ and $t_3$. In other words, the backlight brightness is updated to one or more intermediate brightness levels between the initial brightness level ($B_1$) and the ultimate target brightness level ($B_2$). This avoids a mismatch between the response time of the liquid crystal layer and the response time of the light-emitting diodes of the backlight. The backlight may be gradually updated in a linear fashion as shown by series 172-1. Alternatively, backlight ramping circuit may gradually adjust the backlight brightness according to a step function that approximates a smooth transition as shown by series 172-2.

The gradual change of the backlight brightness may mirror the response curve of the liquid crystal layer. In other words, the gradual backlight brightness change between frames may follow a curve with the same shape as the liquid crystal response curve (or the opposite shape as the liquid crystal response curve). A step function may be used by the backlight ramping circuit to approximate the desired brightness curve. The shapes of the series shown in FIGS. 11 and 12 are merely illustrative. In general, the liquid crystal response curve may be linear, may be curved in any desired manner, may have a combination of linear and curved portions, etc. The backlight brightness curve may be linear, may be curved in any desired manner, may have a combination of linear and curved portions, may follow a step-function that approximates any of the preceding shapes, etc.

As shown in FIG. 7, backlight brightness selection circuit 112 may output backlight brightness values to power consumption compensation circuit 114. Power consumption compensation circuit 114 may ensure that enough power is available to use the backlight brightness values from the backlight brightness selection circuit.

Figure 13:
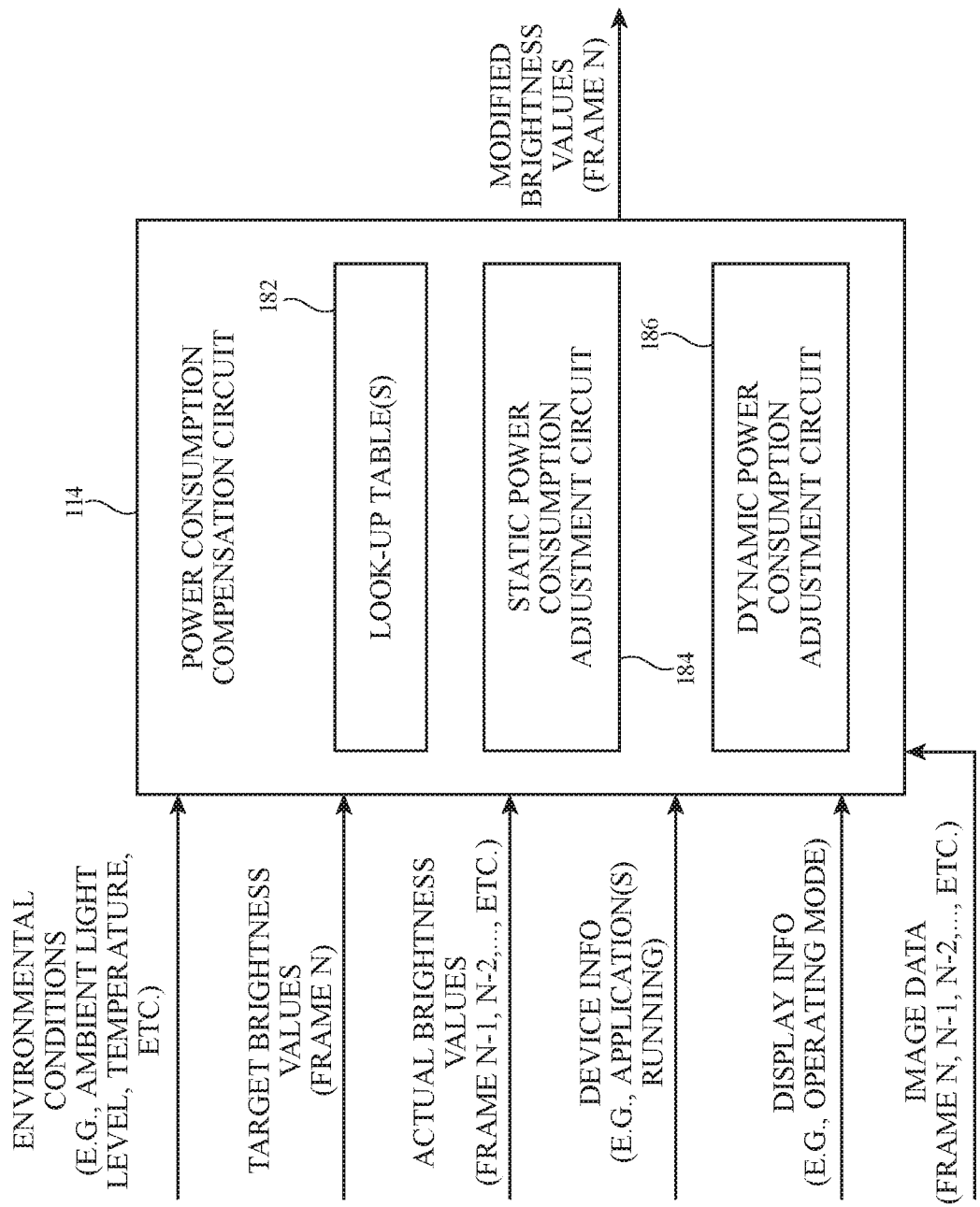
FIG. 13 is a schematic diagram of an illustrative power consumption compensation circuit for an electronic device with a locally adaptable direct-lit backlight in accordance with an embodiment.

FIG. 13 is a diagram of an illustrative power consumption compensation circuit 114. As shown, the power consumption compensation circuit 114 includes look-up tables 182, static power consumption adjustment circuit 184, and dynamic power consumption adjustment circuit 186. Power consumption compensation circuit 114 may receive (e.g., from additional control circuitry in the electronic device) or calculate a maximum allowable amount of power for the backlight.

Static power consumption adjustment circuit 184 within the power consumption compensation circuit may determine if the target brightness values for the current frame (frame N) use more power than the maximum allowable power consumption. In other words, static power consumption adjustment circuit may factor in only the target brightness values of frame N. Static power consumption adjustment circuit 184 may estimate the power consumption associated with operating the backlight using the target brightness values received from selection circuit 112. Look-up tables 182 may be used to estimate the amount of power consumed by operating the backlight using the received target brightness values. For example, each light-emitting diode may have an associated target brightness value. The look-up table may have a table of brightness values and corresponding power consumption. The static power consumption adjustment circuit may use the look-up table to determine the power consumption associated with each light-emitting diode and sum the results into a total estimate of power consumption for frame N.

If the estimated power consumption is less than the maximum allowable power consumption, the received brightness values may be output without modification. However, if the estimated power consumption is greater than the maximum allowable power consumption, the brightness values may be adjusted.

Dynamic power consumption adjustment circuit 186 may account for power consumption limitations that are not detected by static power consumption adjustment circuit 184. As previously described, certain sequences of backlight brightness frames may be provided where each backlight brightness frame, individually, meets the maximum power consumption requirements. However, providing the backlight brightness frames in sequence may exceed maximum power consumption requirements.

Dynamic power consumption adjustment circuit 186 may therefore use both the target brightness values for the current frame (frame N) and the actual brightness values of one or more previous frames (frame N−1, frame N−2, . . . , etc.) to estimate the power consumption of the backlight. Again, look-up tables 182 may be used to convert the brightness levels into estimated amounts of power consumed. Dynamic power consumption adjustment circuit 186 may determine that the estimated power consumption is less than the maximum allowable power consumption. In this case, the received brightness values may be output without modification. Alternatively, dynamic power consumption adjustment circuit 186 may determine that the estimated power consumption is greater than the maximum allowable power consumption. In this case, the brightness values may be adjusted and the modified brightness values may be output.

There are numerous ways in which power consumption compensation circuit 114 may modify the received brightness values in response to determining power consumption needs to be reduced. In general, the brightness of one or more of the light-emitting diodes needs to be reduced until the estimated power consumption is lower than the maximum allowable power consumption. Power consumption compensation circuit 114 may reduce the brightness values evenly (e.g., both low and high brightness values will be reduced proportionally). Alternatively, power consumption compensation circuit 114 may reduce the high brightness values without modifying the low brightness values.

Power consumption compensation circuit 114 may take into account many factors when deciding how to modify the brightness values to ensure power consumption requirements are met. For example, the power consumption compensation circuit may receive image data from one or more image frames. The image data may include a corresponding value for every pixel in the pixel array of the display. The power consumption compensation circuit may analyze the content in the image data to determine whether to reduce the brightness values evenly or reduce only the high brightness values.

Power consumption compensation circuit 114 may also receive device information regarding electronic device 10. The device information may include information such as which software applications are currently operating on the electronic device. The device information may identify a current user of the electronic device and/or any associated user preferences. Any other information regarding the electronic device may optionally be provided to power consumption compensation circuit 114. In one example, power consumption compensation circuit 114 may determine whether to reduce the brightness values evenly or reduce only the high brightness values based on an application that is being operated by the electronic device.

The backlight brightness selection circuit may also receive display information such as a display operating mode and information on environmental conditions. The information on environmental conditions may include information such as the ambient light level or a temperature. The temperature may be an ambient temperature (e.g., the ambient temperature of the environment in which the electronic device is operating) or an internal temperature (e.g., a temperature associated with the display). The environmental conditions may also include information regarding the location of the electronic device or information such as the time of day. In one example, power consumption compensation circuit 114 may determine whether to reduce the brightness values evenly or reduce only the high brightness values based on a display mode of the display. In another example, power consumption compensation circuit 114 may determine whether to reduce the brightness values evenly or reduce only the high brightness values based on ambient light level conditions.

Power consumption compensation circuit 114 may ultimately output modified backlight brightness values to additional control circuitry within the electronic device based on the environmental conditions, target brightness values of the current frame, actual brightness values of previous frames, device information, display information, and image data.

Figure 14:
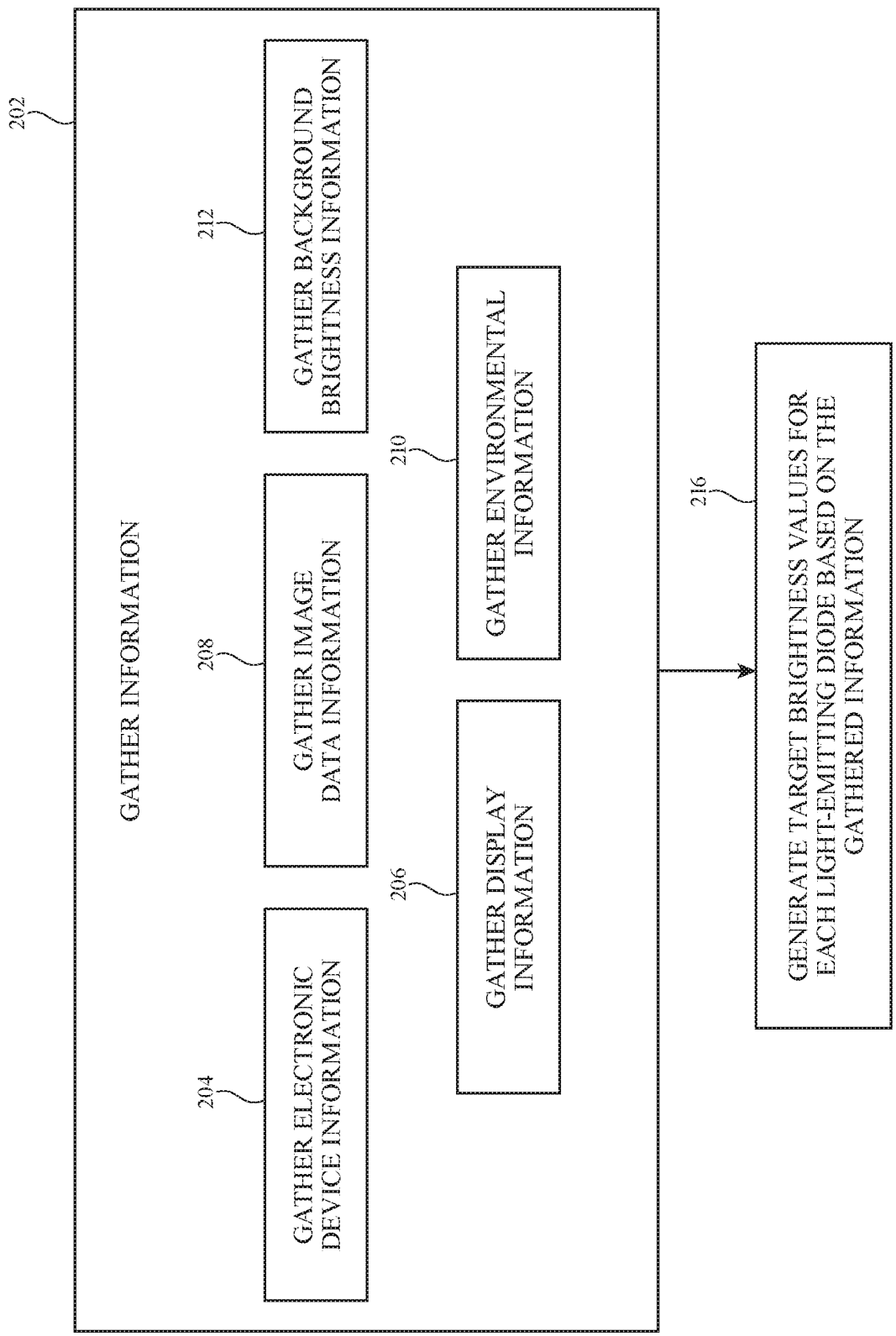
FIG. 14 is a diagram of illustrative method steps for operating an electronic device with a backlight brightness selection circuit in accordance with an embodiment.

FIG. 14 is a diagram of illustrative method steps for operating an electronic device with a backlight brightness selection circuit. As shown, at step 202 the electronic device may gather information that is used for the backlight brightness selection.

At step 204, electronic device information may be gathered. The electronic device information may include information regarding applications currently being operated on the electronic device, information regarding user preferences, and any other desired information associated with the electronic device.

At step 206, display information may be gathered. The display information may include information regarding a display mode, current display settings, user preferences regarding the display, or any other desired information associated with the display.

At step 208, image data information may be gathered. The image data information may include the image data for a current frame and image data for one or more previous frames. The image data may provide information on the type of content that is being displayed on the display (e.g., photographic content, video content, user-interface content, etc.).

At step 210, environmental information may be gathered. The environmental information may be gathered from one or more sensors in the electronic device (e.g., any of sensors 66 in FIG. 5). The environmental information may include ambient light information obtained from an ambient light sensor, temperature information obtained from a temperature sensor, information obtained from an accelerometer, information regarding the time of day, information regarding the location of the electronic device, or any other desired type of environmental information.

At step 212, backlight brightness information may be gathered. The backlight brightness information may include the backlight brightness of one or more previous frames. The backlight brightness information may include a brightness value for each light-emitting diode in the backlight.

At step 216, after gathering all of the information in step 202, a backlight brightness selection circuit may generate target brightness values for each light-emitting diode in the backlight based on the gathered information.

Figure 15:
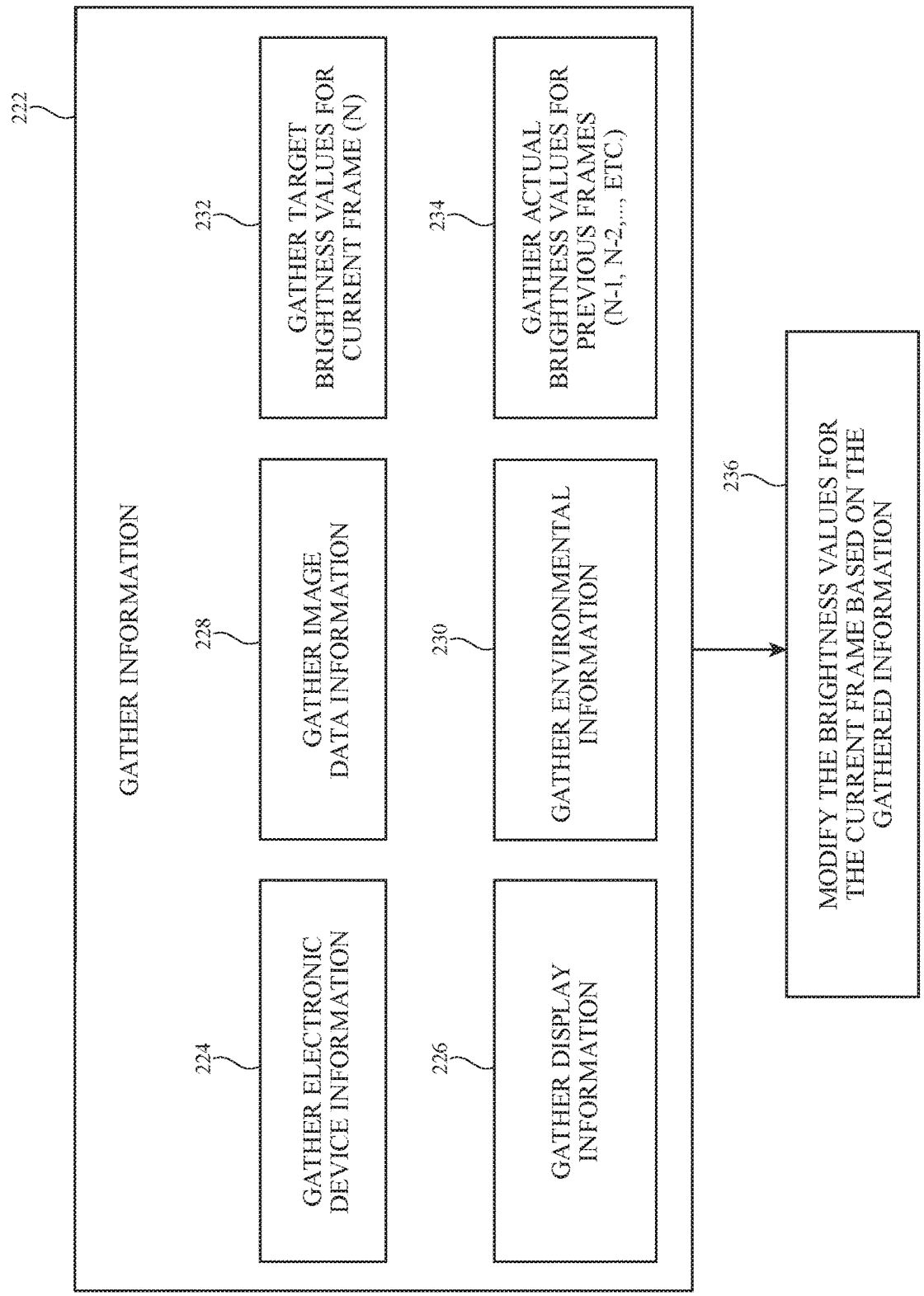
FIG. 15 is a diagram of illustrative method steps for operating an electronic device with a power consumption compensation circuit in accordance with an embodiment.

FIG. 15 is a diagram of illustrative method steps for operating an electronic device with a power consumption compensation circuit. As shown, at step 222 the electronic device may gather information that is used for the power consumption compensation.

At step 224, electronic device information may be gathered. The electronic device information may include information regarding applications currently being operated on the electronic device, information regarding user preferences, and any other desired information associated with the electronic device.

At step 226, display information may be gathered. The display information may include information regarding a display mode, current display settings, user preferences regarding the display, or any other desired information associated with the display.

At step 228, image data information may be gathered. The image data information may include the image data for a current frame and image data for one or more previous frames. The image data may provide information on the type of content that is being displayed on the display (e.g., photographic content, video content, user-interface content, etc.).

At step 230, environmental information may be gathered. The environmental information may be gathered from one or more sensors in the electronic device (e.g., any of sensors 66 in FIG. 5). The environmental information may include ambient light information obtained from an ambient light sensor, temperature information obtained from a temperature sensor, information obtained from an accelerometer, information regarding the time of day, information regarding the location of the electronic device, or any other desired type of environmental information.

At step 232, target brightness values for the current frame (e.g., frame N) may be gathered. The target brightness values may be obtained from a backlight brightness selection circuit (e.g., as generated in step 216 of FIG. 14).

At step 234, brightness values from one or more previous frames (e.g., frame N–1, frame N–2, . . . , etc.) may be gathered. The backlight brightness information for each of the one or more previous frames may include a brightness value for each light-emitting diode in the backlight.

At step 236, after gathering all of the information in step 222, a power consumption compensation circuit may modify the target brightness values for the current frame based on the gathered information.

In various embodiments, an electronic device may include a plurality of pixels, a backlight having a plurality of light-emitting diodes that are configured to produce backlight illumination for the plurality of pixels, and control circuitry configured to, during a first frame, determine brightness values for the plurality of light-emitting diodes based on a first set of image data and, during a second frame that is subsequent to the first frame, display images using a second set of image data while the plurality of light-emitting diodes produces backlight illumination using the brightness values determined during the first frame.

The control circuitry may be configured to, during the second frame, generate a simulated backlight reconstruction based on the brightness values determined during the first frame. Generating the simulated backlight reconstruction may include using one or more point spread functions to simulate an actual backlight brightness value associated with each pixel of the plurality of pixels. The control circuitry may be configured to compensate the second set of image data based on the simulated backlight reconstruction. The control circuitry may be configured to, during the second frame, generate a plurality of tone maps based on the compensated second set of image data. The control circuitry may be configured to, during a third frame that is subsequent to the second frame, adjust a third set of image data using the tone maps generated during the second frame and, during the third frame, display images using the adjusted third set of image data.

Determining the brightness values for the plurality of light-emitting diodes based on the first set of image data may include determining initial target brightness values based on content of the first set of image data. Determining the brightness values for the plurality of light-emitting diodes based on the first set of image data may include modifying the initial target brightness values based at least on additional brightness values used in an additional frame prior to the first frame. Modifying the initial target brightness values based at least on the additional brightness values used in the additional frame may include modifying the initial target brightness values in response to a comparison between the additional brightness values used in the additional frame and the initial target brightness values indicating a scene change. Modifying the initial target brightness values based at least on the additional brightness values used in the additional frame may include applying a temporal filter to the initial target brightness values and the additional brightness values.

In various embodiments, an electronic device may include a display having a plurality of pixels, a backlight having a plurality of light-emitting diodes that are configured to produce backlight illumination for the plurality of pixels, a backlight brightness selection circuit configured to generate new brightness values for the plurality of light-emitting diodes based on image data, and a brightness ramping circuit configured to gradually change the plurality of light-emitting diodes from previous brightness values to the new brightness values.

The plurality of pixels may include a plurality of liquid crystal pixels. The brightness ramping circuit may be configured to gradually change the plurality of light-emitting diodes from the previous brightness values to the new brightness values based on at least on a response time associated with the plurality of liquid crystal pixels. The brightness ramping circuit may be configured to gradually change the plurality of light-emitting diodes from the previous brightness values to the new brightness values according to a step function.

The backlight brightness selection circuit may include a content analysis circuit that generates target brightness values based on the image data. The backlight brightness selection circuit may include a halo mitigation circuit that is configured to modify the target brightness values to mitigate visible artifacts in the display. The backlight brightness selection circuit may include a flicker mitigation circuit that is configured to modify the target brightness values to mitigate flickering in the display. The backlight brightness selection circuit may include a flash mitigation circuit that is configured to analyze the image data to identify a flash risk and that is configured to take action to prevent a flash from occurring when the flash risk is identified. The backlight brightness selection circuit may include a scene change detection circuit that is configured to analyze the image data to identify a scene change and that is configured to modify the target brightness values in response to identifying the scene change.

In various embodiments, an electronic device may include a plurality of pixels, a backlight having a plurality of light-emitting diodes that are configured to produce backlight illumination for the plurality of pixels, and control circuitry configured to generate brightness values for the plurality of light-emitting diodes based on image data. The control circuitry may be configured to use a temporal filter and backlight brightness values from a previous frame to generate the brightness values for the plurality of light-emitting diodes.

In various embodiments, an electronic device may include a plurality of pixels, a backlight having a plurality of light-emitting diodes that are configured to produce backlight illumination for the plurality of pixels, and control circuitry configured to generate brightness values for the plurality of light-emitting diodes based on image data, determine a total power consumption associated with operating the plurality of light-emitting diodes using the brightness values, and modify at least one of the brightness values in response to determining that the total power consumption exceeds a maximum allowable power consumption.

Modifying at least one of the brightness values in response to determining that the total power consumption exceeds the maximum allowable power consumption may include modifying all of the brightness values in response to determining that the total power consumption exceeds the maximum allowable power consumption. Modifying at least one of the brightness values in response to determining that the total power consumption exceeds the maximum allowable power consumption may include modifying at least one and less than all of the brightness values in response to determining that the total power consumption exceeds the maximum allowable power consumption. Determining the total power consumption associated with operating the plurality of light-emitting diodes using the brightness values may include determining the total power consumption associated with operating the plurality of light-emitting diodes using the brightness values and a look-up table. Determining the total power consumption associated with operating the plurality of light-emitting diodes using the brightness values may include determining a total static power consumption associated with operating the plurality of light-emitting diodes using the brightness values and the control circuitry may be configured to determine a total dynamic power consumption associated with operating the plurality of light-emitting diodes based on the brightness values and additional brightness values for at least one previous frame.

Modifying at least one of the brightness values in response to determining that the total power consumption exceeds the maximum allowable power consumption may include taking a mitigating action selected from the group consisting of: scaling all of the brightness values and scaling only a subset of the brightness values. Taking the mitigating action may include taking the mitigating action based at least on a display mode. Taking the mitigating action may include taking the mitigating action based at least on received electronic device information. The received electronic device information may include information regarding an application operating on the electronic device. Taking the mitigating action may include taking the mitigating action based at least on the image data. The electronic device may also include at least one sensor configured to obtain sensor data. Taking the mitigating action may include taking the mitigating action based at least on the sensor data. The at least one sensor may include an ambient light sensor and the sensor data may include ambient light sensor data.

In various embodiments, an electronic device may include a plurality of pixels, a backlight having a plurality of light-emitting diodes that are configured to produce backlight illumination for the plurality of pixels, a backlight brightness selection circuit configured to generate brightness values for the plurality of light-emitting diodes based on image data, and a power consumption compensation circuit configured to modify the brightness values to meet power requirements.

The power consumption compensation circuit may include a look-up table that includes a plurality of power consumption amounts associated with respective brightness values. The power consumption compensation circuit may include a static power consumption adjustment circuit that is configured to modify the brightness values to meet the power requirements based only on the brightness values for a current frame. The power consumption compensation circuit may include a dynamic power consumption adjustment circuit that is configured to modify the brightness values to meet the power requirements based on both the brightness values for a current frame and brightness values for a previous frame.

The electronic device may also include a backlight reconstruction circuit that is configured to generate a simulated backlight reconstruction based on the modified brightness values from the power consumption compensation circuit. The electronic device may also include a pixel compensation circuit configured to compensate image data based on the simulated backlight reconstruction received from the backlight reconstruction circuit, a tone mapping circuit configured to generate a plurality of tone maps based on the compensated image data received from the pixel compensation circuit, and a pixel manipulation circuit configured to modify image data based on the plurality of tone maps received from the tone mapping circuit and configured to provide the modified image data to the plurality of pixels.

In various embodiments, an electronic device may include a plurality of pixels, a backlight having a plurality of light-emitting diodes that are configured to produce backlight illumination for the plurality of pixels, and control circuitry configured to generate target brightness values for the plurality of light-emitting diodes, determine a respective power consumption associated with each target brightness value using a look-up table, sum the power consumptions to determine a total power consumption associated with operating the plurality of light-emitting diodes using the target brightness values, and output modified brightness values for the plurality of light-emitting diodes based on the total power consumption.

The control circuitry may be configured to produce the modified brightness values by evenly scaling all of the target brightness values. The control circuitry may be configured to produce the modified brightness values by scaling only a subset of the target brightness values and the subset of the target brightness values may include the brightest of the brightness values.

In various embodiments, an electronic device may include a plurality of pixels, a backlight having a plurality of light-emitting diodes that are configured to produce backlight illumination for the plurality of pixels, and control circuitry configured to generate brightness values for the plurality of light-emitting diodes based on image data and based on information regarding an application operating on the electronic device.

The control circuitry may be configured to generate the brightness values using a halo mitigation circuit that modifies target brightness values based on the information regarding the application operating on the electronic device. The halo mitigation circuit may be configured to reduce at least one of the target brightness values based on the information regarding the application operating on the electronic device. The halo mitigation circuit may be configured to modify the target brightness values based on the information regarding the application operating on the electronic device and based on a type of content identified in the image data. The halo mitigation circuit may be configured to modify a first subset of the target brightness values that are associated with a first portion of the image data, the halo mitigation circuit may be configured to forgo modifying a second subset of the target brightness values that are associated with a second portion of the image data, the first portion of the image data may be associated with photograph-based content, and the second portion of the image data may be associated with user-interface-based content.

The control circuitry may be configured to generate the brightness values using a flicker mitigation circuit that modifies target brightness values based on the information regarding the application operating on the electronic device. The control circuitry may be configured to generate the brightness values using target brightness values, brightness values of a previous frame, and a filter. The filter may have parameters that are determined based on the information regarding the application operating on the electronic device. The electronic device may also include a sensor configured to gather sensor data and the parameters of the filter may be determined based on the sensor data. The parameters of the filter may be determined based on a display operating mode.

In various embodiments, an electronic device may include a plurality of pixels, a backlight having a plurality of light-emitting diodes that are configured to produce backlight illumination for the plurality of pixels, a sensor configured to gather sensor data, and control circuitry configured to generate brightness values for the plurality of light-emitting diodes based on image data and based on the sensor data.

The control circuitry may be configured to generate the brightness values using a halo mitigation circuit that modifies target brightness values based on the sensor data. The halo mitigation circuit may be configured to modify the target brightness values based on the sensor data and based on a type of content identified in the image data. The halo mitigation circuit may be configured to modify a first target brightness value that is associated with a first portion of the display by a first amount and the halo mitigation circuit may be configured to modify a second target brightness value that is associated with a second portion of the display by a second amount that is different than the first amount.

The control circuitry is configured to generate the brightness values using target brightness values, brightness values of a previous frame, and a temporal filter that has parameters determined at least partially using the sensor data. The parameters may be determined at least partially using information regarding an application operating on the electronic device and using information regarding a display operating mode. The sensor may include an ambient light sensor and the sensor data may include ambient light sensor data. The sensor may include a temperature sensor and the sensor data may include temperature sensor data.

In various embodiments, an electronic device may include a display having a plurality of pixels that has an adjustable operating mode, a backlight having a plurality of light-emitting diodes that are configured to produce backlight illumination for the plurality of pixels, and control circuitry configured to generate brightness values for the plurality of light-emitting diodes based on image data and based on the operating mode of the display. The control circuitry may be configured to generate the brightness values for different light-emitting diodes using different parameters depending on the type of content associated with the image data for each light-emitting diode.

The foregoing is merely illustrative and various modifications can be made to the described embodiments. The foregoing embodiments may be implemented individually or in any combination.

What is claimed is:

1. An electronic device comprising:
    a plurality of pixels;
    a backlight having a plurality of light-emitting diodes that are configured to produce backlight illumination for the plurality of pixels; and
    control circuitry configured to:
        generate brightness values for the plurality of light-emitting diodes based on image data;
        determine a total power consumption associated with operating the plurality of light-emitting diodes using the brightness values, wherein the brightness values include a highest subset of brightness values; and
        clip the highest subset of brightness values in response to determining that the total power consumption exceeds a maximum allowable power consumption.

2. The electronic device defined in claim 1, wherein determining the total power consumption associated with operating the plurality of light-emitting diodes using the brightness values comprises determining the total power consumption associated with operating the plurality of light-emitting diodes using the brightness values and a look-up table.

3. The electronic device defined in claim 1, wherein determining the total power consumption associated with operating the plurality of light-emitting diodes using the brightness values comprises determining a total static power consumption associated with operating the plurality of light-emitting diodes using the brightness values and wherein the control circuitry is configured to:
    determine a total dynamic power consumption associated with operating the plurality of light-emitting diodes based on the brightness values and additional brightness values for at least one previous frame.

4. The electronic device defined in claim 1, wherein the control circuitry is configured to:
    before clipping the highest subset of brightness values in response to determining that the total power consumption exceeds a maximum allowable power consumption, select clipping as a mitigating action from among at least two mitigation actions based at least on a display mode.

5. The electronic device defined in claim 1, wherein the control circuitry is configured to:
    before clipping the highest subset of brightness values in response to determining that the total power consumption exceeds a maximum allowable power consumption, select clipping as a mitigating action from among at least two mitigation actions based at least on received electronic device information.

6. The electronic device defined in claim 5, wherein the received electronic device information comprises information regarding an application operating on the electronic device.

7. The electronic device defined in claim 1, wherein the control circuitry is configured to:
   before clipping the highest subset of brightness values in response to determining that the total power consumption exceeds a maximum allowable power consumption, select clipping as a mitigating action from among at least two mitigation actions based at least on the image data.

8. An electronic device comprising:
   a plurality of pixels;
   a backlight having a plurality of light-emitting diodes that are configured to produce backlight illumination for the plurality of pixels;
   at least one sensor configured to obtain sensor data; and
   control circuitry configured to:
      generate brightness values for the plurality of light-emitting diodes based on image data;
      determine a total power consumption associated with operating the plurality of light-emitting diodes using the brightness values;
      in response to determining that the total power consumption exceeds a maximum allowable power consumption, select, based at least on the sensor data, a mitigating action from the group consisting of: scaling all of the brightness values and scaling only a subset of the brightness values; and
      perform the mitigation action to obtain corrected brightness values.

9. The electronic device defined in claim 8, wherein the at least one sensor comprises an ambient light sensor and wherein the sensor data comprises ambient light sensor data.

10. An electronic device comprising:
    a plurality of pixels;
    a backlight having a plurality of light-emitting diodes that are configured to produce backlight illumination for the plurality of pixels;
    a backlight brightness selection circuit configured to generate brightness values for the plurality of light-emitting diodes based on image data; and
    a power consumption compensation circuit configured to modify the brightness values to meet power requirements, wherein the power consumption compensation circuit comprises a dynamic power consumption adjustment circuit that is configured to modify the brightness values to meet the power requirements based on both the brightness values for a current frame and brightness values for a previous frame.

11. The electronic device defined in claim 10, wherein the power consumption compensation circuit comprises:
    a look-up table that includes a plurality of power consumption amounts associated with respective brightness values.

12. The electronic device defined in claim 11, wherein the power consumption compensation circuit comprises:
    a static power consumption adjustment circuit that is configured to modify the brightness values to meet the power requirements based only on the brightness values for the current frame.

13. The electronic device defined in claim 10, further comprising:
    a backlight reconstruction circuit that is configured to generate a simulated backlight reconstruction based on the modified brightness values from the power consumption compensation circuit.

14. The electronic device defined in claim 13, further comprising:
    a pixel compensation circuit configured to compensate image data based on the simulated backlight reconstruction received from the backlight reconstruction circuit;
    a tone mapping circuit configured to generate a plurality of tone maps based on the compensated image data received from the pixel compensation circuit; and
    a pixel manipulation circuit configured to modify image data based on the plurality of tone maps received from the tone mapping circuit and configured to provide the modified image data to the plurality of pixels.

* * * * *